United States Patent
Nishita et al.

(10) Patent No.: US 6,835,240 B2
(45) Date of Patent: Dec. 28, 2004

(54) INK COMPOSITIONS FOR INKJET RECORDING

(75) Inventors: Nobuhiro Nishita, Kanagawa (JP); Yoshiharu Yabuki, Kanagawa (JP); Junichi Yamanouchi, Kanagawa (JP)

(73) Assignee: Fuji Photo Film Co., Ltd., Ashigara (JP)

( * ) Notice: Subject to any disclaimer, the term of this patent is extended or adjusted under 35 U.S.C. 154(b) by 122 days.

(21) Appl. No.: 10/187,604

(22) Filed: Jul. 3, 2002

(65) Prior Publication Data

US 2003/0159617 A1 Aug. 28, 2003

(30) Foreign Application Priority Data

Jul. 4, 2001 (JP) ..................................... P. 2001-203496

(51) Int. Cl.⁷ .............................................. C09D 11/00

(52) U.S. Cl. ................ 106/31.48; 106/31.5; 106/31.58; 106/31.59

(58) Field of Search ............................. 106/31.48, 31.5, 106/31.58, 31.59; 347/100; 534/766, 767, 769

(56) References Cited

U.S. PATENT DOCUMENTS

| 5,431,720 A | * | 7/1995 | Nagai et al. ............. 106/31.43 |
| 5,451,251 A | * | 9/1995 | Mafune et al. .......... 106/31.48 |
| 5,626,655 A | | 5/1997 | Pawlowski et al. |
| 5,733,363 A | * | 3/1998 | Nagashima et al. ..... 106/31.43 |
| 5,837,043 A | | 11/1998 | Wong et al. |
| 2003/0089274 A1 | * | 5/2003 | Nishita et al. .......... 106/31.48 |
| 2003/0097959 A1 | * | 5/2003 | Omatsu et al. .......... 106/31.43 |

FOREIGN PATENT DOCUMENTS

| JP | 58-74761 A | 5/1983 |
| JP | 60-92369 A | 5/1985 |
| JP | 6-88048 A | 3/1994 |
| JP | 8-333532 A | 12/1996 |
| JP | 8-333533 A | 12/1996 |
| JP | 2000-265098 A | 9/2000 |

* cited by examiner

*Primary Examiner*—Helene Klemanski
(74) *Attorney, Agent, or Firm*—Burns, Doane, Swecker & Mathis, L.L.P.

(57) ABSTRACT

An ink composition for inkjet recording comprising: an azo dye having an aromatic nitrogen-containing 6-membered heterocycle as a coupling component; an aqueous medium; and a surfactant, wherein the azo dye is dissolved or dispersed in the aqueous medium.

8 Claims, No Drawings

INK COMPOSITIONS FOR INKJET RECORDING

FIELD OF THE INVENTION

The present invention relates to an ink composition for inkjet recording (which may hereinafter be called "inkjet recording ink composition") capable of providing high-quality recorded images, excellent in discharge stability and also excellent in shelf life of the images thus formed.

BACKGROUND OF THE INVENTION

With recent widespread use of computers, inkjet printers have come to be used not only at offices but also at home for printing images on paper, film or cloth.

Inkjet recording is conducted by the following method, for example, a method of discharging ink droplets by making use of a piezoelectric element to apply pressure to them; a method of discharging ink droplets by heating an ink to generate air bubbles therein; a method making use of ultrasonic wave; or a method of making use of static power for suction and discharge of ink droplets. Inks for such inkjet recording methods, aqueous inks, oil-based inks or solid (molten) inks are used. Of these, aqueous inks are most popularly employed in consideration of manufacturing ease, handling ease, odor and safety.

Colorants used for such inkjet recording inks are required to have high solubility in a solvent, permit high-density recording, provide good hue, have excellent fastness to light, heat, air, water and chemicals, have good fixing property to an image receiving material without cause bleeding easily, have excellent storage stability as an ink, have no toxicity, have high purity and be available at a low cost. It is however very difficult to find a colorant capable of satisfying the above-described requirements without lowering their levels. Particularly, there is a strong demand for a colorant having a good magenta hue and excellent light fastness.

A variety of dyes and pigments have already been proposed for use in inkjet recording and they are practically used. Colorants satisfying all of the above-described requirements have however not yet been found. It is difficult to attain satisfactory color hue and light fastness simultaneously by using conventionally well known dyes or pigments having a color index number assigned thereto.

In Japanese Patents Laid-Open Nos. 74761/1983 and 92369/1985, proposed is an ink comprising a dye, glycerin, and diethylene glycol or an ethylene-oxide adduct of an alcohol, while use of an ethylene-oxide adduct of a long-chain linear alcohol is proposed in Japanese Patent Laid-Open No. 265098/2000. These proposals are however accompanied with the drawback that the quality of an image formed using the above-described ink deteriorates during storage.

In Japanese Patents Laid-Open Nos. 88048/1994, 333532/1996 and 333533/1996, and U.S. Pat. Nos. 5,837,043 and 5,626,655, proposed are inks comprising an ethylene-oxide adduct of a higher alcohol and capable of lessening bleeding of a recorded image, but these inks also involve problems such as tendency to cause clogging and a change in color tone due to poor shelf life of an image after printing.

SUMMARY OF THE INVENTION

An object of the present invention is therefore to provide an inkjet recording ink composition having high discharge stability and being free from defects in hue, weather resistance, water resistance and image quality.

(1) An ink composition for inkjet recording obtained by dissolving or dispersing, in an aqueous medium, an azo dye having an aromatic nitrogen-containing 6-membered heterocycle as a coupling component, said composition further comprising a surfactant.

(2) An ink composition for inkjet recording as described above in (1), wherein the azo dye is represented by the following formula (A-1):

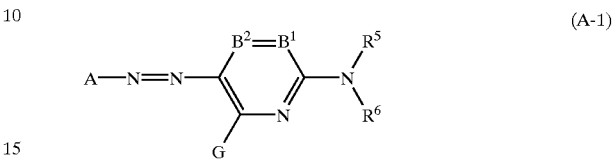

wherein,

A represents a residue of a 5-membered heterocyclic diazo component $A-NH_2$, $B^1$ and $B^2$ represent $=CR^1-$ and $-CR^2=$, respectively, or either one represents a nitrogen atom and the other one represents $=CR^1-$ or $-CR^2=$, $R^5$ and $R^6$ each independently represents a hydrogen atom, an aliphatic group, an aromatic group, a heterocyclic group, an acyl group, an alkoxycarbonyl group, aryloxycarbonyl group, a carbamoyl group, an alkyl- or aryl-sulfonyl group or a sulfamoyl group, which may each have a substituent, and G, $R^1$, and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a silyloxy group, an acyloxy group a carbamoyloxy group, a heterocyclic oxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, an alkyl- or aryl-sulfonyl group, a heterocyclic sulfonyl group, an alkyl- or aryl-sulfinyl group, a heterocyclic sulfinyl group, a sulfamoyl group, a sulfo group, or a heterocyclic thio group, which may each have a substituent, or a pair $R^1$ and $R^5$, or a pair $R^5$ and $R^6$ may be coupled to form a 5- or 6-membered ring.

(3) An ink composition for inkjet recording as described above in (1) or (2), wherein the surfactant is a nonionic surfactant.

(4) An ink composition for inkjet recording as described above in any one of (1) to (3), wherein the surfactant is represented by the formula (I) or (II):

wherein, $R_1$ represents a $C_{5-40}$ alkyl group and $m^1$ represents an average mole of ethylene oxide added, specifically, 2 to 40.

wherein, $R_2$ represents a $C_{5-40}$ alkyl group and $m^2$ represents an average mole of ethylene oxide added, specifically 2 to 40.

(5) An inkjet recording method, which comprises using an ink composition for inkjet recording as described above in any one (1) to (4).

(6) An inkjet recording method, which comprises discharging, according to a recording signal, ink droplets onto an image receiving material having, on a substrate thereof, an image receiving layer containing white inorganic pigment particles and recording an image onto the image receiving material, wherein the ink droplets are made of an ink composition for inkjet recording as described above in any one of (1) to (4).

DETAILED DESCRIPTION OF THE INVENTION

The invention will hereinafter be described more specifically.

A dye to be used for the inkjet recording ink composition of the invention is an azo dye having as a coupling component an aromatic nitrogen-containing 6-membered heterocycle, of which that represented by the following formula (A-1) is preferred.

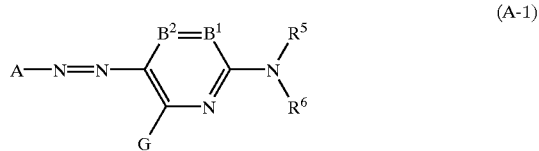

(A-1)

In the formula (A-1), A represents the residue of a 5-membered heterocyclic diazo component A-NH$_2$. Examples of the hetero atom of the heterocycle include N, O and S. Preferred is a nitrogen-containing 5-membered heterocycle and the heterocycle may be condensed with an aliphatic ring, an aromatic ring or another heterocycle. Preferred examples of the heterocycle as A include pyrazole ring, imidazole ring, thiazole ring, isothiazole ring, thiadiazole ring, benzothiazole ring, benzoxazole ring and benzoisothiazole ring. Each of these heterocyclic groups may have a substituent further. Of these, the pyrazole ring, imidazole ring, isothiazole ring, thiadiazole ring and benzothiazole ring represented by the below-described formulas (a) to (f) are preferred.

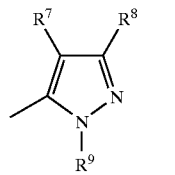

(a)

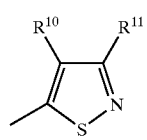

(b)

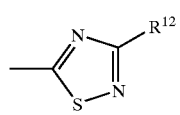

(c)

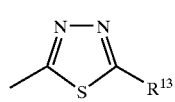

(d)

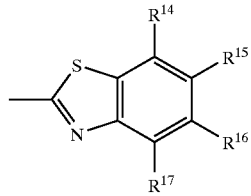

(e)

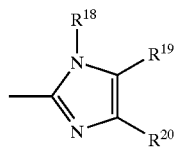

(f)

In the above-described formulas (a) to (f), $R^7$ to $R^{20}$ represents substituents similar to those described in G, $R^1$ and $R^2$.

Of the formulas (a) to (f), preferred are pyrazole and isothiazole rings represented by the formulas (a) and (b), with the pyrazole ring of the formula (a) being most preferred.

$B^1$ and $B^2$ represent =CR$^1$— and —CR$^2$=, respectively, or one of them represents a nitrogen atom and the other one represents =CR$^1$— or —CR$^2$=, of which the former case is preferred.

$R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may each have a substituent further. Preferred examples of the substituent represented by $R^5$ or $R^6$ include a hydrogen atom, aliphatic groups, aromatic groups, heterocyclic groups, acyl groups, and alkyl- or aryl-sulfonyl groups. Of these, a hydrogen atom, aromatic groups, heterocyclic groups, acyl groups, and alkyl- or aryl-sulfonyl groups are more preferred, with a hydrogen atom, aryl groups and heterocyclic groups being most preferred. $R^5$ and $R^6$ however do not represent a hydrogen atom simultaneously. Each of these groups may have a substituent further.

G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group, an acylamino group, an ureido group, a sulfamoylamino group, an alkoxycarbonylamino group, a heterocyclic sulfonylamino group, an alkyl- or aryl-sulfonylamino group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group or a sulfo group, which may each have a substituent further.

Preferred examples of the substituent represented by G include a hydrogen atom, halogen atoms, aliphatic groups, aromatic groups, a hydroxyl group, alkoxy groups, aryloxy groups, acyloxy groups, heterocyclic oxy groups, an amino group, acylamino groups, an ureido group, a sulfamoylamino group, alkoxycarbonylamino groups, aryloxycarbonylamino groups, alkyl- or aryl-thio groups and heterocyclic thio groups, of which a hydrogen atom, halogen atoms, alkyl groups, a hydroxyl group, alkoxy groups, aryloxy groups, acyloxy groups, an amino group, and acylamino groups are preferred, with a hydrogen atom, arylamino groups and acylamino group being most preferred. Each of these groups may have a substituent further.

Preferred examples of the substituent represented by $R^1$ or $R^2$ include a hydrogen atom, halogen atoms, alkyl groups, alkoxycarbonyl groups, a carboxyl group, a carbamoyl group, a hydroxyl group, alkoxy groups and a cyano group. Each of these groups may have a substituent further.

A pair $R^1$ and $R^5$, or a pair $R^5$ and $R^6$ may be coupled to form a 5- or 6-membered ring.

When each of the substituents represented by A, $R^1$, $R^2$, $R^5$, $R^6$ and G has a substituent further, substituents similar to those described in G, $R^1$ and $R^2$ can be given as examples.

When the dye of the invention is a water soluble dye, it has, as a substituent, an ionic hydrophilic group on any one position of A, $R^1$, $R^2$, $R^5$, $R^6$ and G. Examples of the ionic hydrophilic group as a substituent include a sulfo group, carboxyl group, phosphono group, and quaternary ammonium groups. As the ionic hydrophilic group, carboxyl, phosphono and sulfo groups are preferred, with carboxyl and sulfo groups being especially preferred. The carboxyl, phosphono or sulfo group may be in the form of a salt. Examples of the counterion which forms its salt include ammonium ion, alkali metal ions (ex. lithium ion, sodium ion and potassium ion) and organic cations (ex. tetramethylammonium ion and tetramethylguanidium ion).

The term "aliphatic group" as used herein means an alkyl group, a substituted alkyl group, an alkenyl group, a substituted alkenyl group, an alkynyl group, a substituted alkynyl group, an aralkyl group and a substituted aralkyl group. The aliphatic group may be branched or alternatively, may form a ring. The aliphatic group preferably has 1 to 20, more preferably 1 to 16 carbon atoms. The aryl portion of the aralkyl or substituted aralkyl group is preferably phenyl or naphthyl, with phenyl being especially preferred. Examples of the aliphatic group include methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl.

The term "aromatic group" as used herein means an aryl group and a substituted aryl group. As the aryl group, a phenyl or naphthyl group is preferred, with a phenyl group being especially preferred. The aromatic group has preferably 6 to 20, more preferably 6 to 16 carbon atoms. Examples of the aromatic group include phenyl, p-tolyl, p-methoxyphenyl, o-chlorophenyl and m-(3-sulfopropylamino)phenyl.

The term "heterocyclic group" embraces a substituted heterocyclic group and an unsubstituted heterocyclic group. The heterocycle may be condensed with an aliphatic ring, an aromatic ring or another heterocycle. As the heterocyclic group, a 5- or 6-membered heterocyclic group is preferred. Examples of the substituent include aliphatic groups, halogen atoms, alkyl- and aryl-sulfonyl groups, acyl groups, acylamino groups, sulfamoyl group, carbamoyl group and ionic hydrophilic groups. Examples of the heterocyclic group include 2-pyridyl, 2-thienyl, 2-thiazolyl, 2-benzothiazolyl, 2-benzoxazolyl and 2-furyl.

The term "alkyl- or aryl-sulfonyl group" embraces a substituted alkyl- or aryl-sulfonyl group, and an unsubstituted alkyl- or aryl-sulfonyl group. Examples of the alkyl- or aryl-sulfonyl group include methylsulfonyl group or phenylsulfonyl group, respectively.

The term "alkyl- or aryl-sulfinyl group" embraces a substituted alkyl- or aryl-sulfinyl group and an unsubstituted alkyl- or aryl-sulfinyl group. Examples of the alkyl- and aryl-sulfinyl groups include methylsulfinyl group and phenylsulfinyl group, respectively.

The term "acyl group" embraces a substituted acyl group and an unsubstituted acyl group. The acyl group has preferably 1 to 12 carbon atoms. Examples of the substituent include ionic hydrophilic groups. Examples of the acyl group include acetyl and benzoyl.

Examples of the halogen atom include fluorine, chlorine and bromine atoms.

The term "amino group" embraces an amino group substituted with an alkyl group, aryl group and/or heterocyclic group. The alkyl group, aryl group and/or heterocyclic group may have a substituent further As the alkylamino group, that having 1 to 6 carbon atoms is preferred. Examples of the substituent include ionic hydrophilic groups. Examples of the alkylamino groups include methylamino and diethylamino.

The term "arylamino group" embraces a substituted arylamino group and an unsubstituted arylamino group. As the arylamino group, that having 6 to 12 carbon atoms is preferred. Examples of the substituent include halogen atoms and ionic hydrophilic groups. Examples of the arylamino group include phenylamino and 2-chlorophenylamino.

The term "alkoxy group" embraces a substituted alkoxy group and an unsubstituted alkoxy group. As the alkoxy group, that having 1 to 12 carbon atoms is preferred. Examples of the substituent include alkoxy groups, hydroxyl group, and ionic hydrophilic groups. Examples of the alkoxy group include methoxy, ethoxy, isopropoxy, methoxyethoxy, hydroxyethoxy and 3-carboxypropoxy.

The term "aryloxy group" embraces a substituted aryloxy group and an unsubstituted aryloxy group. As the aryloxy group, that having 6 to 12 carbon atoms is preferred. Examples of the substituent include alkoxy groups and ionic hydrophilic groups. Examples of the aryloxy group include phenoxy, p-methoxyphenoxy and o-methoxyphenoxy.

The term "acylamino group" embraces a substituted acylamino group. The acylamino group has preferably 2 to 12 carbon atoms. Examples of the substituent include ionic hydrophilic groups. Examples of the acylamino group include acetylamino, propionylamino, benzoylamino, N-phenylacetylamino and 3,5-disulfobenzoylamino.

The term "ureido group" embraces a substituted ureido group and an unsubstituted ureido group. The ureido group has preferably 1 to 12 carbon atoms. Examples of the substituent include alkyl and aryl groups. Examples of the ureido group include 3-methylureido, 3,3-dimethylureido and 3-phenylureido.

The term "sulfamoylamino group" embraces a substituted sulfamoylamino group and an unsubstituted sulfamoylamino group. Examples of the substituent include alkyl groups. Examples of the sulfamoylamino group include N,N-dipropylsulfamoylamino.

The term "alkoxycarbonylamino group" embraces a substituted alkoxycarbonylamino group and an unsubstituted alkoxycarbonylamino group. The alkoxycarbonylamino group has preferably 2 to 12 carbon atoms. Examples of the substituent include ionic hydrophilic groups. Examples of the alkoxycarbonylamino group include ethoxycarbonylamino group.

The term "alkyl- or aryl-sulfonylamino group" embraces a substituted alkyl- or aryl-sulfonylamino group and an unsubstituted alkyl- or aryl-sulfonylamino group. The sulfonylamino group has preferably 1 to 12 carbon atoms. Examples of the substituent include ionic hydrophilic groups. Examples of the alkyl- or aryl-sulfonylamino group include methylsulfonylamino, N-phenylmethylsulfonylamino, phenylsulfonylamino and 3-carboxyphenylsulfonylamino.

The term "carbamoyl group" embraces a substituted carbamoyl group and an unsubstituted carbamoyl group. Examples of the substituent include alkyl groups. Examples of the carbamoyl group include methylcarbamoyl and dimethylcarbamoyl.

The term "sulfamoyl group" embraces a substituted sulfamoyl group and an unsubstituted sulfamoyl group. Examples of the substituent include alkyl groups. Examples of the sulfamoyl group include dimethylsulfamoyl and di-(2-hydroxyethyl)sulfamoyl.

The term "alkoxycarbonyl group" embraces a substituted alkoxycarbonyl group and an unsubstituted alkoxycarbonyl group. The alkoxycarbonyl group has preferably 2 to 12 carbon atoms. Examples of the substituent include ionic hydrophilic groups. Examples of the alkoxycarbonyl group include methoxycarbonyl and ethoxycarbonyl.

The term "acyloxy group" embraces a substituted acyloxy group and an unsubstituted acyloxy group. The acyloxy group has preferably 1 to 12 carbon atoms. Examples of the substituent include ionic hydrophilic groups. Examples of the acyloxy group include acetoxy and benzoyloxy.

The term "carbamoyloxy group" embraces a substituted carbamoyloxy group and an unsubstituted carbamoyloxy group. Examples of the substituent include alkyl groups. Examples of the carbamoyloxy group include N-methylcarbamoyloxy group.

The term "aryloxycarbonyl group" embraces a substituted aryloxycarbonyl group and an unsubstituted aryloxycarbonyl group. The aryloxycarbonyl group has preferably 7 to 12 carbon atoms. Examples of the substituent include ionic hydrophilic groups. Examples of the aryloxycarbonyl group include phenoxycarbonyl.

The term "aryloxycarbonylamino group" embraces a substituted aryloxycarbonylamino group and an unsubstituted aryloxycarbonylamino group. The aryloxycarbonylamino group has preferably 7 to 12 carbon atoms. Examples of the substituent include ionic hydrophilic groups. Examples of the aryloxycarbonylamino group include phenoxycarbonylamino.

The term "alkyl-, aryl- or heterocyclic-thio group" embraces a substituted alkyl-, aryl- or heterocyclic-thio group and an unsubstituted alkyl-, aryl- or heterocyclic-thio group. The alkyl-, aryl- or heterocyclic thio group has preferably 1 to 12 carbon atoms. Examples of the substituent include ionic hydrophilic groups. Examples of the alkyl-, aryl- or heterocyclic-thio group include methylthio, phenylthio and 2-pyridylthio groups.

As the silyloxy group, that substituted with a $C_{1-12}$ aliphatic or aromatic group is preferred. Examples of the substituted silyloxy group include trimethylsilyloxy and diphenylmethylsilyloxy.

The term "heterocyclic oxy group" embraces a substituted heterocyclic oxy group and an unsubstituted heterocyclic oxy group. The heterocyclic oxy group has preferably 2 to 12 carbon atoms. Examples of the substituent include alkyl, alkoxy and ionic hydroxyl groups. Examples of the heterocyclic oxy group include 3-pyridyloxy and 3-thienyloxy.

The term "alkoxycarbonyloxy group" embraces a substituted alkoxycarbonyloxy group or an unsubstituted alkoxycarbonyloxy group. The alkoxycarbonyloxy group has preferably 2 to 12 carbon atoms. Examples of the alkoxycarbonyloxy group include methoxycarbonyloxy and isopropoxycarbonyloxy.

The term "aryloxycarbonyloxy group" embraces a substituted aryloxycarbonyloxy group and an unsubstituted aryloxycarbonyloxy group. The aryloxycarbonyloxy group has preferably 7 to 12 carbon atoms. Examples of the aryloxycarbonyloxy group include phenoxycarbonyloxy.

The term "heterocyclic oxycarbonyl group" embraces a substituted heterocyclic oxycarbonyl group and an unsubstituted heterocyclic oxycarbonyl group. The heterocyclic oxycarbonyl group has preferably 2 to 12 carbon atoms. Examples of the substituent include ionic hydrophilic groups. Examples of the heterocyclic oxycarbonyl group include 2-pyridyloxycarbonyl.

The term "heterocyclic sulfonylamino group" embraces a substituted heterocyclic sulfonylamino group and an unsubstituted heterocyclic sulfonylamino group. The heterocyclic sulfonylamino group has preferably 1 to 12 carbon atoms. Examples of the substituent include ionic hydrophilic groups. Examples of the heterocyclic sulfonylamino group include 2-thiophenesulfonylamino and 3-pyridinesulfonylamino.

The term "heterocyclic sulfonyl group" embraces a substituted heterocyclic sulfonyl group and an unsubstituted heterocyclic sulfonyl group. The heterocyclic sulfonyl group has preferably 1 to 12 carbon atoms. Examples of the substituent include ionic hydrophilic groups. Examples of the heterocyclic sulfonyl group include 2-thiophenesulfonyl and 3-pyridinesulfonyl.

The term "heterocyclic sulfinyl group" embraces a substituted heterocyclic sulfinyl group and an unsubstituted heterocyclic sulfinyl group. The heterocyclic sulfinyl group has preferably 1 to 12 carbon atoms. Examples of the substituent include ionic hydrophilic groups. Examples of the heterocyclic sulfinyl group include 4-pyridinesulfinyl.

In the invention, a structure represented by the following formula (A-2) is especially preferred.

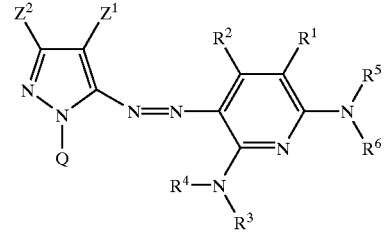

(A-2)

In the formula (A-2), $Z^1$ represents an electron attractive group having a Hammett substituent constant $\delta p$ of 0.20 or greater. The electron attractive group represented by $Z^1$ has preferably $\delta p$ of 0.30 or greater, more preferably 0.45 or greater, especially 0.60 or greater. The constant $\delta p$ is however desired not to exceed 1.0. Preferred specific examples of the substituent include electron attractive substituents which will be described later. Of these, preferred are $C_{2-12}$ acyl groups, $C_{2-12}$ alkyloxycarbonyl groups, nitro group, cyano group, $C_{1-12}$ alkylsulfonyl groups, $C_{6-18}$ arylsulfonyl groups, $C_{1-12}$ carbamoyl groups, and $C_{1-12}$ alkyl halide groups, of which cyano group, $C_{1-12}$ alkylsulfonyl groups, $C_{6-18}$ arylsulfonyl groups are especially preferred, with cyano group being most preferred.

$R^1$, $R^2$, $R^5$ and $R^6$ have the same meanings as described in the formula (A-1).

$R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group. Of these, a hydrogen atom, an aromatic group, a heterocyclic group, an acyl group, and an alkyl- or aryl-sulfonyl group are preferred, with a hydrogen atom, an aromatic group and a heterocyclic group being especially preferred.

$Z^2$ represents a hydrogen atom, an aliphatic group, an aromatic group or a heterocyclic group. Q represents a hydrogen atom, an aliphatic group, an aromatic group or a heterocyclic group. As Q, a group made of a nonmetal atomic group necessary for forming a 5- to 8-membered ring is preferred. The 5- to 8-membered ring may be substituted, be saturated or have an unsaturated bond. An aromatic group and a heterocyclic group are especially preferred. Preferred examples of the nonmetal atom include nitrogen atom, oxygen atom, sulfur atom and carbon atom. Specific examples of such a cyclic structure include benzene, cyclopentane, cyclohexane, cycloheptane, cyclooctane, cyclohexene, pyridine, pyrimidine, pyrazine, pyridazine, triazine, imidazole, benzimidazole, oxazole, benzoxazole, thiazole, benzothiazole, oxane, sulfolane and thiane rings.

The groups as described in the formula (A-2) may each have a substituent further. When they have a substituent, substituents similar to those described in the formula (A-1), those mentioned in G, $R^1$, or $R^2$ by way of example and ionic hydrophilic groups can be given as examples.

With regards to $Z^1$, a Hammett substituent constant σp value as used herein will next be described. The Hammett rule is an empirical rule suggested by L. P. Hammett in 1935 in order to deal quantitatively with the influence of substituents on reactions or equilibria of benzene derivatives, and nowadays its validity is widely accepted. The substituent constants determined by the Hammett rule include σp values and σm values, many of which are described in general books and are described in detail, for example, in "Lange's Handbook of Chemistry," 12th edition, ed. by J. A. Dean, published in 1979 (McGraw-Hill), and in "Journal of Japanese Chemistry", Extra Number, No. 122, pages 96 to 103, 1979 (Nankodo Co., Ltd.) In the present invention, each substituent is stipulated by the Hammett substituent constant σp values. It is however needless to say that substituents are not limited by these values which are known and described in literature in these books but rather the present invention includes substituents whose Hammett substituent constant σp values are not known in the literature but when measured in accordance with the Hammett rule, fall within its range. The compounds represented by the formulas (A-1) and (A-2) of the invention are not always benzene derivatives, but σp values are used as a measure for indicating electron effects of the substituent irrespective of the position of the substituent. In the invention, σp values are used in this sense.

Examples of electron attractive groups having a Hammett substituent constant σp value of 0.60 or greater include cyano group, nitro group, and alkylsulfonyl groups (such as methylsulfonyl and arylsulfonyl (e.g., benzenesulfonyl)).

Examples of electron attractive groups having an Hammett substituent constant σp value of 0.45 or greater include, in addition to the above-described ones, acyl groups (such as acetyl), alkoxycarbonyl groups (such as dodecyloxycarbonyl), aryloxycarbonyl groups (such as m-chlorophenoxycarbonyl), alkylsulfinyl groups (such as n-propylsulfinyl), arylsulfinyl groups (ex. phenylsulfinyl), sulfamoyl groups (such as N-ethylsulfamoyl and N,N-dimethylsulfamoyl), and alkyl halilde groups (such as trifluoromethyl).

Examples of the electron attractive groups with a σp value of 0.30 or greater include, in addition to the above-described groups, acyloxy groups (such as acetoxy), carbamoyl groups (such as N-ethylcarbamoyl and N,N-dibutylcarbamoyl), halogenated alkoxy groups (such as trifluoromethyloxy), halogenated aryloxy groups (such as pentafluorophenyloxy), sulfonyloxy groups (ex. methylsulfonyloxy), halogenated alkylthio groups (such as difluoromethylthio), aryl groups substituted with at least two electron attractive groups having a σp value of 0.15 or greater (such as 2,4-dinitrophenyl and pentachlorophenyl) and heterocycles (such as 2-benzoxazolyl, 1-benzothiazolyl and 1-phenyl-2-benzimidazolyl). Specific examples of the electron attractive group having a σp value of 0.20 or greater include, in addition to the above-described ones, halogen atoms.

The following are particularly preferred combinations of substituents for azo dyes of the formula (A-1). As $R^5$ and $R^6$, preferred are a hydrogen atom, alkyl groups, aryl groups, heterocyclic groups, a sulfonyl group and acyl groups, of which a hydrogen atom, aryl groups, heterocyclic groups and a sulfonyl group are preferred, with a hydrogen atom, aryl groups and heterocyclic groups being most preferred. $R^5$ and $R^6$ however do not represent a hydrogen atom simultaneously.

As G, preferred are a hydrogen atom, halogen atoms, alkyl groups, a hydroxyl group, an amino group and an acylamino groups, of which a hydrogen atom, halogen atoms, an amino group and acylamino groups are more preferred, with a hydrogen atom, an amino group and acylamino groups being still more preferred.

As A, preferred are pyrazole, imidazole, isothiazole, thiadiazole and benzothiazole rings, of which pyrazole and isothiazole rings are more preferred, with pyrazole ring being most preferred.

$B^1$ and $B^2$ are $=CR^1-$ and $-CR^2=$, respectively, and, as each of $R^1$ and $R^2$, a hydrogen atom, halogen atoms, a cyano group, a carbamoyl group, a carboxyl group, alkyl groups, a hydroxyl group, alkoxy groups and alkoxycarbonyl groups, more preferably a hydrogen atom, alkyl groups, a carboxyl group, a cyano group and a carbamoyl group are preferred.

As the compound of the formula (A-1), those having, as at least one of various substituents, the above-described preferred group are preferred, of which those having more substituents selected from the above-described preferred groups are more preferred, with those having all the substituents selected from the above-described preferred groups being most preferred.

Specific examples of the azo dye of the formula (A-1) will be described below, but azo dyes usable in the invention are not limited thereto.

TABLE 1
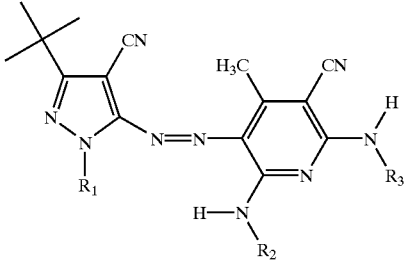
| Dye | R₁ | R₂ | R₃ |
|---|---|---|---|
| a-1 | 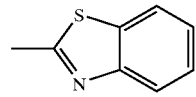 | 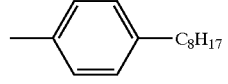 | 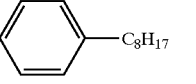 |
| a-2 | 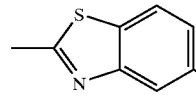 | 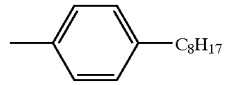 | 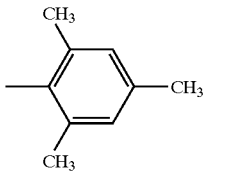 |
| a-3 | 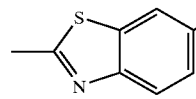 | 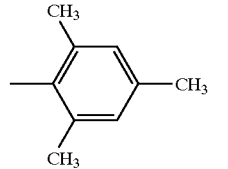 | 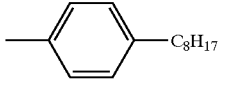 |
| a-4 | 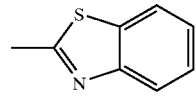 | 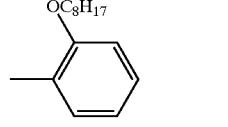 | 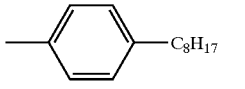 |
| a-5 | 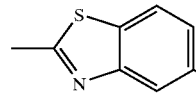 | 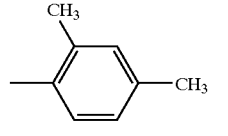 | 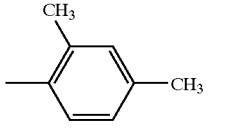 |

TABLE 2
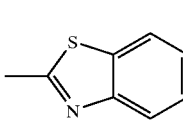
| Dye | R₁ | R₂ | R₃ |
|---|---|---|---|
| a-6 | 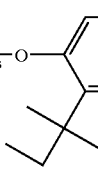 | 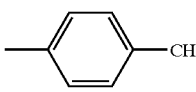 | 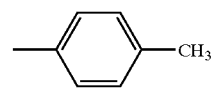 |
| a-7 | 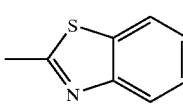 | 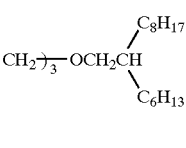 | 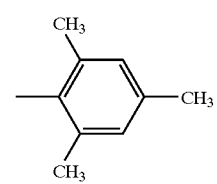 |
| a-8 | 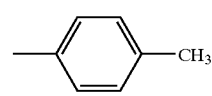 | 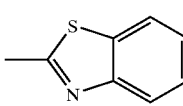 | 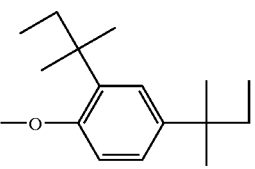 |
| a-9 | 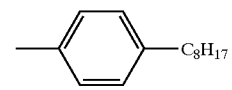 | 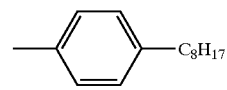 | $C_8H_{17}(t)$ 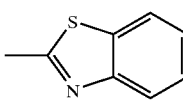 |
| a-10 | 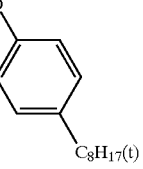 | 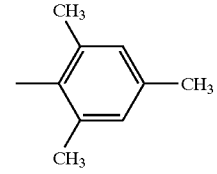 |  |

TABLE 3

Structure: Pyrazole-azo-pyridine dye with substituents R₁ (position 3 of pyrazole), CN (position 4 of pyrazole), R₂ (N1 of pyrazole), azo linkage to pyridine bearing H₃C, CN, NH-R₃, NH-R₄ groups.

| Dye | R₁ | R₂ | R₃ | R₄ |
|-----|-----|-----|-----|-----|
| a-11 | tert-butyl | 2-(6-sulfonato-sodium)benzothiazolyl | 4-methylphenyl | 4-sulfonato-sodium-phenyl |
| a-12 | tert-butyl | 2-(6-sulfonato-potassium)benzothiazolyl | 2-sulfonato-potassium-phenyl | 2-sulfonato-potassium-phenyl |
| a-13 | phenyl | 2-(6-carboxy-potassium)benzothiazolyl | 4-sulfonato-potassium-phenyl | 3-carboxy-potassium-phenyl |
| a-14 | 2-chlorophenyl | 2-(sulfonato-potassium)benzothiazolyl (4,5-mix) | 4-sulfonato-potassium-phenyl | 3-carboxy-phenyl (COOH) |
| a-15 | 4-sulfonato-potassium-phenyl | 2-benzothiazolyl | 2-sulfonato-potassium-phenyl | 3-carboxy-potassium-phenyl |

TABLE 4

Structure: Pyrazole-azo-pyridine dye with tert-butyl at position 3 of pyrazole, CN at position 4, R₁ on N1; the pyridine bears H₃C, CN, N(R₂)(R₃), and NH-R₄.

| Dye | R₁ | R₂ | R₃ | R₄ |
|-----|-----|-----|-----|-----|
| a-16 | 2-benzothiazolyl | 2-benzothiazolyl | 2,4,6-trimethylphenyl (mesityl) | 2,4,6-trimethylphenyl (mesityl) |

TABLE 4-continued

[Structure: pyrazole with t-Bu, CN, N=N azo linkage to pyridine bearing H3C, R2, R3, R4, NH-R4 substituents]

| Dye | R₁ | R₂ | R₃ | R₄ |
|---|---|---|---|---|
| a-17 | 5-Cl-2-benzothiazolyl (methyl-substituted) | —SO₂CH₃ | 2,3,5-trimethylphenyl | 4-methylphenyl |
| a-18 | 2-methylbenzothiazolyl | —COCH₃ | $C_8H_{17}(t)$ | $C_8H_{17}(t)$ |
| a-19 | 5-Cl-2-methylbenzothiazolyl | 2-methylbenzothiazolyl | 2,5-dimethylphenyl | phenyl |
| a-20 | 6-Cl-2-methylbenzothiazolyl | —SO₂CH₃ | 2,5-dimethylphenyl | $C_8H_{17}(t)$ |

TABLE 5

[Structure: same pyrazole-azo-pyridine core as Table 4]

| Dye | R₁ |
|---|---|
| a-21 | 2-methylbenzothiazol-6-yl-SO₂NH—(CH₂)₃—O—(2,4-di-tert-pentylphenyl) |
| a-22 | 2-methylbenzothiazolyl |

TABLE 5-continued
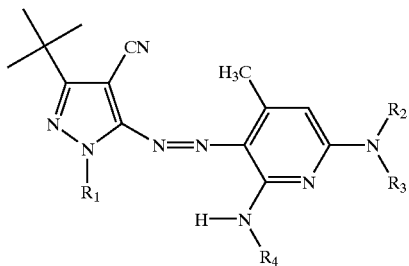
| | |
|---|---|
| a-23 | 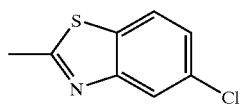 |
| a-24 | 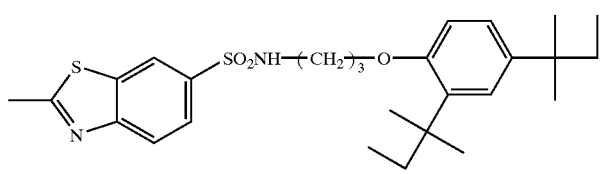 |
| a-25 | 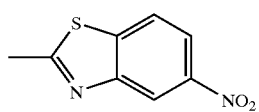 |
| Dye | R$_2$ |
|---|---|
| a-21 | 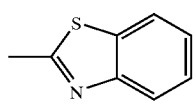 |
| a-22 | 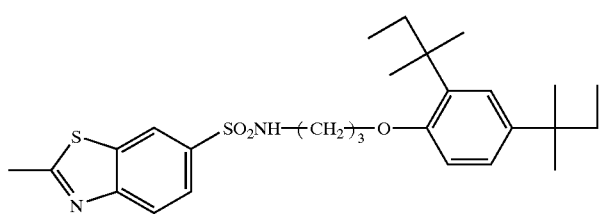 |
| a-23 | 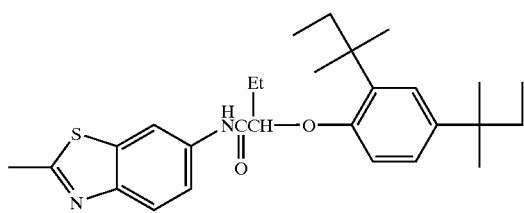 |
| a-24 | 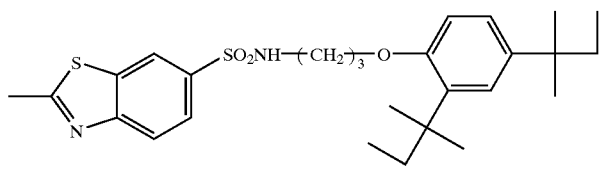 |

TABLE 5-continued
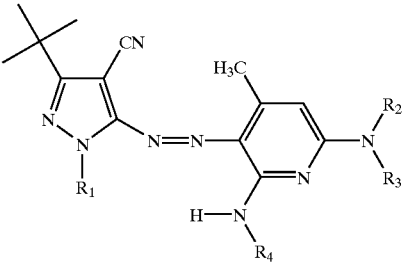
| Dye | R$_3$ | R$_4$ |
|---|---|---|
| a-21 | 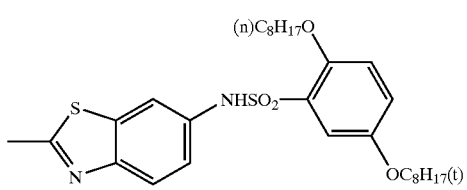 | 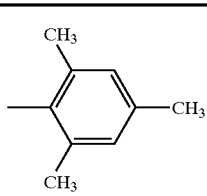 |
| a-22 | 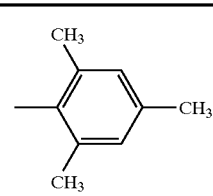 | 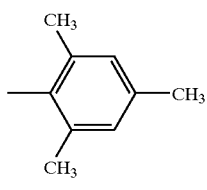 |
| a-23 | 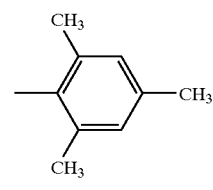 | 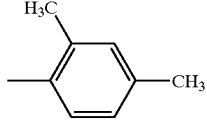 |
| a-24 | 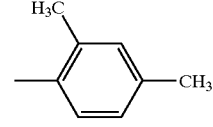 | 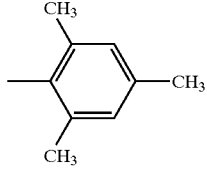 |
| a-25 | 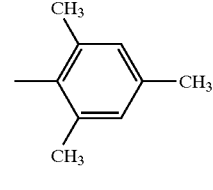 | 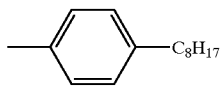 |

TABLE 6

(Structure: pyrazole with tert-butyl, CN, and N-R₁ substituents, connected via azo linkage to a pyridine bearing CH₃, NR₂R₃, and NH-R₄ groups)

| Dye | R₁ |
|-----|----|
| a-26 | 2-methylbenzothiazol-6-yl-SO₃K |
| a-27 | 2-methylbenzothiazol-6-yl-SO₂NH-(3,5-dicarboxyphenyl) |
| a-28 | 2-methylbenzothiazol-(5,6-mix)-yl-SO₂NH-(3,5-dicarboxyphenyl) |
| a-29 | 2-methylbenzothiazol-(5,6-mix)-yl-SO₃Na |

| Dye | R₂ |
|-----|----|
| a-26 | 2-methylbenzothiazol-6-yl-SO₃K |
| a-27 | 2-methylbenzothiazol-6-yl-SO₂NH-(3,5-dicarboxyphenyl) |
| a-28 | 2-methylbenzothiazol-(5,6-mix)-yl-SO₂NH-(3,5-dicarboxyphenyl) |
| a-29 | 2-methylbenzothiazol-(5,6-mix)-yl-SO₂NH-(3,5-dicarboxyphenyl) |

| Dye | R₃ | R₄ |
|-----|----|----|
| a-26 | 2,3,5,6-tetramethylphenyl | 2,3,5,6-tetramethylphenyl |
| a-27 | 2,3,5,6-tetramethylphenyl | 2,3,5,6-tetramethylphenyl |
| a-28 | 2,3,5,6-tetramethylphenyl | 2,3,5,6-tetramethylphenyl |
| a-29 | 4-methylphenyl | 2,6-dimethylphenyl |

TABLE 7

[Structure: Pyrazole-azo-pyridine dye with substituents R1, R2, R3 on pyrazole ring and R4, R5, R6, R7, R8 on pyridine ring system]

| Dye | R$_1$ | R$_2$ | R$_3$ | R$_4$ | R$_5$ |
|---|---|---|---|---|---|
| a-30 | 2,3-dimethylphenyl (CH$_3$, CH$_3$) | CN | 2-pyridyl | H | CONH$_2$ |
| a-31 | t-Bu | Br | 2-pyrimidyl | COOEt | H |
| a-32 | 2-pyridyl | SO$_2$CH$_3$ | 4-methyl-2,6-bis(NHCH$_3$)-1,3,5-triazinyl | CONH$_2$ | H |
| a-33 | t-Bu | CN | 2,4,5-tricyanophenyl-methyl | H | H |

| Dye | R$_6$ | R$_7$ | R$_8$ |
|---|---|---|---|
| a-30 | SO$_2$CH$_3$ | 2-methyl-5-(OC$_8$H$_{17}$)phenyl | 2-methylphenyl |
| a-31 | 2-benzothiazolyl | C$_8$H$_{17}$(t) | COCH$_3$ |
| a-32 | 6-chloro-2-benzothiazolyl | 4-methylphenyl | CO-t-Bu |
| a-33 | 5-chloro-2-benzothiazolyl | 2-methylphenyl | SO$_2$CH$_3$ |

TABLE 8
| Dye | R₁ | R₂ | R₃ | R₄ | R₅ | R₆ | R₇ | R₈ |
|---|---|---|---|---|---|---|---|---|
| a-34 | 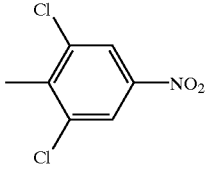 | Br |  | H | CONH₂ | 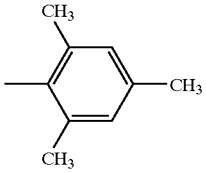 | 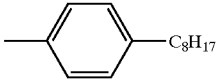 |  |
| a-35 | 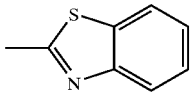 | CN | 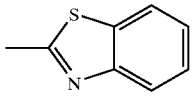 | CH₃ | H | 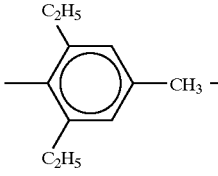 | 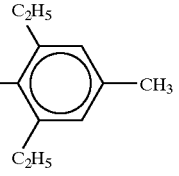 |  |
| a-36 | 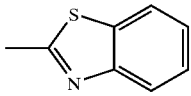 | CN | 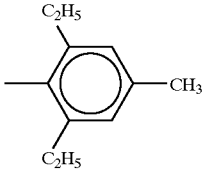 | CH₃ | CN | H | 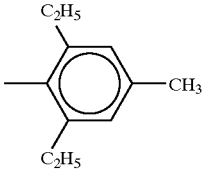 | 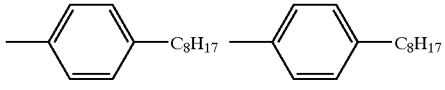 |
TABLE 9
| Dye | R₁ | R₂ | R₃ | R₄ | R₅ | R₆ |
|---|---|---|---|---|---|---|
| b-1 | CH₃ | CH₃ | CN | H | 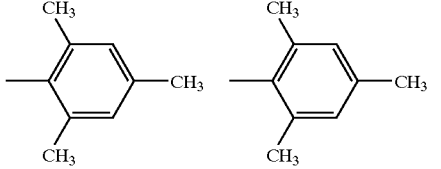 | 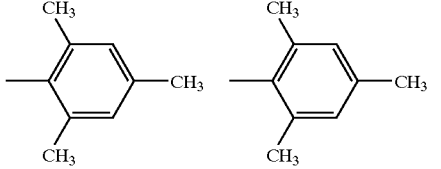 |
| b-2 | CH₃ | CH₃ | CN | H |  |  |

TABLE 9-continued

[Structure: isothiazole-CN with R1, connected via N=N azo to pyridine bearing R2, R3, NR4R5, and NH-R6]

| Dye | R₁ | R₂ | R₃ | R₄ | R₅ | R₆ |
|---|---|---|---|---|---|---|
| b-3 | CH₃ | CH₃ | CONH₂ | H | –C₆H₄–C₈H₁₇ (4-octylphenyl) | 2,4,6-trimethylphenyl (mesityl) |
| b-4 | CH₃ | CH₃ | H | H | 2,4,6-trimethylphenyl (mesityl) | 2,4,6-trimethylphenyl (mesityl) |
| b-5 | CH₃ | H | CN | H | 3-methyl-4-(SO₃Na)phenyl | 2-methyl-4-(SO₃Na)phenyl |

TABLE 10

[Structure: same isothiazole-azo-pyridine core with R1–R6]

| Dye | R₁ | R₂ | R₃ | R₄ | R₅ | R₆ |
|---|---|---|---|---|---|---|
| b-6 | CH₃ | CH₃ | H | | 2-benzothiazolyl | 2,4,6-trimethylphenyl (mesityl) | 2,4,6-trimethylphenyl (mesityl) |
| b-7 | CH₃ | CH₃ | H | | 2-benzothiazolyl | 2,4,6-trimethylphenyl (mesityl) | 4-octylphenyl (–C₆H₄–C₈H₁₇) |

TABLE 10-continued

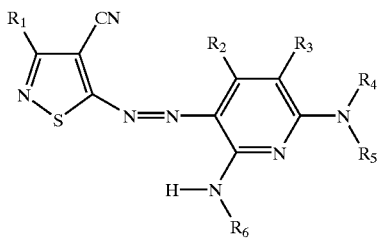

| Dye | R₁ | R₂ | R₃ | R₄ | R₅ | R₆ |
|---|---|---|---|---|---|---|
| b-8 | CH₃ | H | H | SO₂CH₃ | | |

TABLE 11

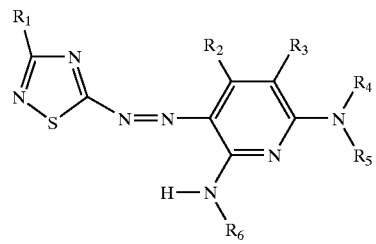

| Dye | R₁ | R₂ | R₃ | R₄ | R₅ | R₆ |
|---|---|---|---|---|---|---|
| c-1 | —SCH₃ | CH₃ | CN | H | C₈H₁₇(t) | p-C₈H₁₇-phenyl |
| c-2 | phenyl | H | CONH₂ | H | p-SO₃K-phenyl | p-SO₃K-phenyl |
| c-3 | —S-CH₂CH₂-SO₃K | CH₃ | H | 2-methyl-6-SO₃K-benzothiazolyl | p-SO₃K-phenyl | p-SO₃K-phenyl |
| c-4 | —CH₃ | CH₃ | H | 2-methyl-benzothiazol-6-yl-SO₂NH(CH₂)₃O-(2,4-di-tert-pentylphenyl) | 2,4,6-trimethylphenyl | p-C₈H₁₇-phenyl |
| c-5 | phenyl | H | H | 2-methyl-benzothiazol-6-yl-NHSO₂ | 2,4,6-trimethylphenyl | C₈H₁₇(t) |

TABLE 12
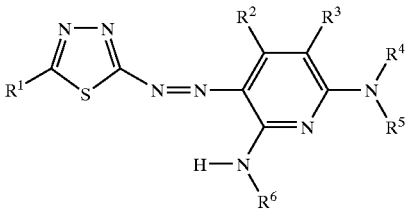
| Dye | R₁ | R₂ | R₃ | R₄ | R₅ | R₆ |
|---|---|---|---|---|---|---|
| d-1 | $CH_3$ | $CH_3$ | CN | H | 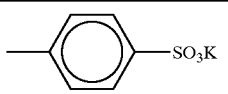 | 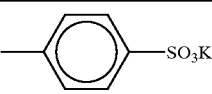 |
| d-2 | $CH_3$ | $CH_3$ | CN | H | 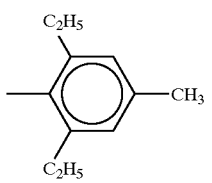 | 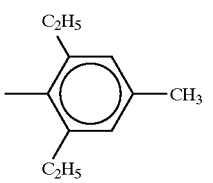 |
| d-3 | $CH_3$ | H | H | 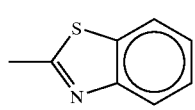 | 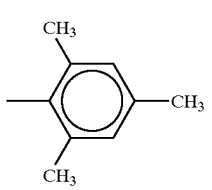 | 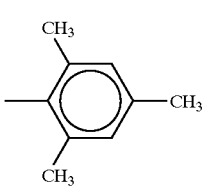 |
| d-4 | 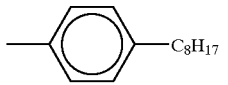 | $CH_3$ | $CONH_2$ | H | 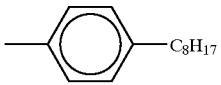 | 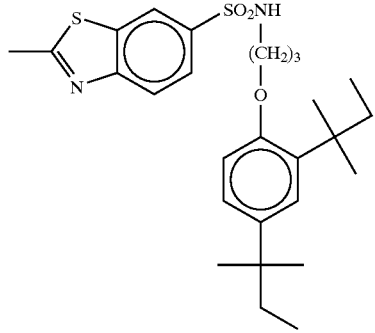 |
| d-5 | 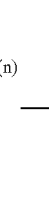 | $CH_3$ | H | 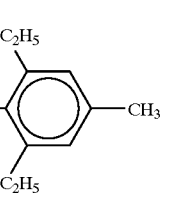 | 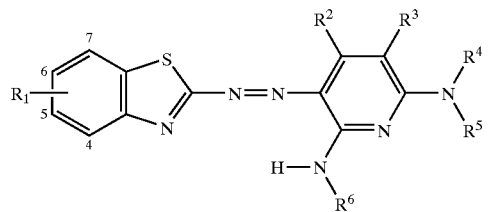 | 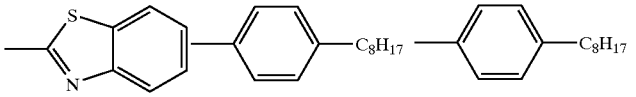 |
TABLE 13
| Dye | R₁ | R₂ | R₃ | R₄ | R₅ | R₆ |
|---|---|---|---|---|---|---|
| e-1 | 5-Cl | $CH_3$ | $CONH_2$ | H | $C_8H_{17}(t)$ | $C_8H_{17}(t)$ |
| e-2 | 5,6-diCl | H | H | (benzothiazole) | $-C_6H_4-C_8H_{17}$ | $-C_6H_4-C_8H_{17}$ |

TABLE 13-continued

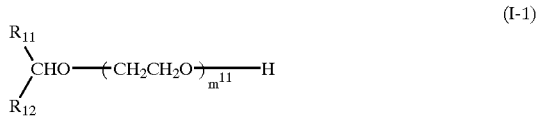

| Dye | R₁ | R₂ | R₃ | R₄ | R₅ | R₆ |
|---|---|---|---|---|---|---|
| e-3 | 5,6-diCl | $CH_3$ | H | (benzothiazole) | (2,6-dimethylphenyl with CH₃) | $COCH_3$ |
| e-4 | 5-$CH_3$ | H | CN | H | (phenyl-$SO_3K$) | (phenyl-$SO_3K$) |
| e-5 | 5-$NO_2$ | $CH_3$ | H | $SO_2CH_3$ | (o-tolyl) | (2,4,6-trimethylphenyl) |

The inkjet recording ink compositions of the invention each contains the azo dye preferably in an amount of 0.2 to 20% by mass, more preferably 0.5 to 15% by mass.

A description will next be made of a surfactant contained in the inkjet recording ink composition of the present invention.

By incorporating a surfactant in the inkjet recording ink composition of the present invention, thereby controlling the physical properties of the ink solution, it is possible to bring about excellent effects for improving discharge stability of ink, improving water resistance of the recorded image and preventing bleeding of the printed ink.

Examples of the surfactant include anionic surfactants such as fatty acid salts, alkyl sulfates, alkylbenzene sulfonates, alkylnaphthalene sulfonates, dialkylsufosuccinates, alkyl phosphates, naphthalene-sulfonic acid-formalin condensate, and polyoxyethylene alkyl sulfates; cationic surfactants such as fatty amine salts, quaternary ammonium salts and alkyl pyridinium salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, oxyethylene oxypropylene block copolymer, and acetylene-based polyoxyethylene oxide.

Nonionic surfactants are preferred in consideration of the above-described effects, and also discharge stability of ink and prevention of bleeding. Especially compounds represented by the following formula (I) or (II) are preferred.

$$R_1O-(CH_2CH_2O)_{m^1}-H \quad (I)$$

wherein, $R_1$ represents a $C_{5-40}$, preferably $C_{8-18}$ alkyl group which may be linear or branched, or may be substituted.

Examples of the substituent for an alkyl group represented by $R_1$ include aryl groups (such as phenyl, o-tolyl, p-tolyl and p-t-butylphenyl), alkoxy groups (such as methoxy, ethoxy and n-butoxy) and halogen atoms (such as chlorine and bromine atoms).

Specific examples of the alkyl group represented by $R_1$ include n-pentyl, n-hexyl, n-octyl, n-decyl, n-dodecyl, n-pentadecyl, n-octadecyl, 2-ethylhexyl, 1-ethylpentyl, 1-n-butylpentyl, 1-n-pentylhexyl, 1-n-hexylheptyl, 1-n-heptyloctyl, 1-n-octylnonyl, 6-methoxyhexyl, and 2-phenylethyl.

$m^1$ represents an average mole of ethylene oxide added and, more specifically, 2 to 40, preferably 3 to 30, especially 3 to 20.

Of the compounds represented by the formula (I), those represented by the formula (I-1) are especially preferred in the present invention.

(I-1)

wherein, $R_{11}$ and $R_{12}$ each independently represents a $C_{4-10}$ saturated hydrocarbon and they have 8 to 18 carbon atoms in total, $m^{11}$ stands for 3 to 20. Examples of the $C_{4-10}$ saturated hydrocarbon represented by $R_{11}$ or $R_{12}$ include n-butyl, i-butyl, n-pentyl, n-hexyl, n-heptyl, n-octyl, 2-ethylhexyl, n-nonyl and n-decyl. $R_{11}$ and $R_{12}$ have 8 to 18 carbon atoms in total, with 8 to 16 carbon atoms being more preferred. $m^{11}$ stands for 3 to 20, more preferably 5 to 20, still more preferably 6 to 18.

Specific examples of the compound represented by the formula (I) will next be described, but the present invention is not limited thereto.

W1-1,2

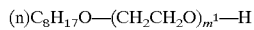

W1-1: $m^1=5$
W1-2: $m^1=10$
W1-3,4

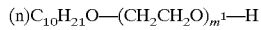

W1-3: $m^1=10$
W1-4: $m^1=15$
W1-5~7

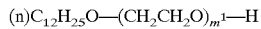

W1-5: $m^1=10$
W1-6: $m^1=15$
W1-7: $m^1=20$
W1-8

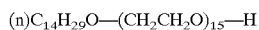

W1-9

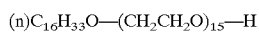

W1-10, 11

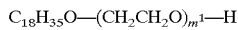

W1-10: $m^1=12$
W1-11: $m^1=25$
W1-12

Specific examples of the compound represented by the formula (I-1) will next be described, but the present invention is not limited thereto.

TABLE 14

Specific examples of the compound of the formula (I-1)

| No. | $R^{11}$ | $R^{12}$ | $m^{11}$ |
|---|---|---|---|
| W1-13 | (n) $C_4H_9$ | (n) $C_4H_9$ | 3 |
| W1-14 | (i) $C_4H_9$ | (i) $C_4H_9$ | 5 |
| W1-15 | (i) $C_4H_9$ | (i) $C_4H_9$ | 9.5 |
| W1-16 | (i) $C_4H_9$ | (i) $C_4H_9$ | 11.4 |
| W1-17 | (n) $C_5H_{11}$ | (n) $C_5H_{11}$ | 8 |
| W1-18 | (n) $C_5H_{11}$ | (n) $C_5H_{11}$ | 10 |
| W1-19 | (n) $C_5H_{11}$ | (n) $C_5H_{11}$ | 11.4 |
| W1-20 | (n) $C_5H_{11}$ | (n) $C_5H_{11}$ | 13.5 |
| W1-21 | (n) $C_5H_{11}$ | (n) $C_6H_{13}$ | 15 |
| W1-22 | (n) $C_6H_{13}$ | (n) $C_6H_{13}$ | 10 |
| W1-23 | (n) $C_6H_{13}$ | (n) $C_6H_{13}$ | 13.6 |
| W1-24 | (n) $C_6H_{13}$ | (n) $C_6H_{13}$ | 15.8 |
| W1-25 | (n) $C_6H_{13}$ | (n) $C_7H_{15}$ | 16 |
| W1-26 | (n) $C_7H_{15}$ | (n) $C_7H_{15}$ | 15 |
| W1-27 | (n) $C_7H_{15}$ | (n) $C_7H_{15}$ | 16.5 |
| W1-28 | (n) $C_8H_{17}$ | (n) $C_8H_{17}$ | 14 |
| W1-29 | (n) $C_8H_{17}$ | (n) $C_8H_{17}$ | 17.6 |
| W1-30 | (n) $C_8H_{17}$ | (n) $C_{10}H_{21}$ | 20 |

The compound represented by the formula (II) will next be described.

$$R_2COO-(CH_2CH_2O)_{m^2}-H \quad (II)$$

wherein, $R_2$ represents a $C_{5-40}$, preferably $C_{5-30}$ alkyl group which may be linear or branched, or may be substituted.

Examples of the substituent for the alkyl group represented by $R_2$ include aryl groups (such as phenyl, o-tolyl, p-tolyl and p-t-butylphenyl), alkoxy groups (such as methoxy, ethoxy and n-butoxy) and halogen atoms (such as chlorine and bromine atoms) Specific examples of the alkyl group represented by $R_2$ include n-pentyl, n-hexyl, n-octyl, n-decyl, n-dodecyl, n-pentadecyl, n-octadecyl, 2-ethylhexyl, 1-ethylpentyl, 1-n-butylheptyl, 1-n-hexylnonyl, 1-n-heptyldecyl, 1-n-octyldodecyl, 1-n-decyltatradecyl, 6-methoxyhexyl, and 2-phenylethyl.

$m^2$ represents an average mole of ethylene oxide added and, more specifically, 2 to 40, preferably 3 to 30, especially 4 to 20.

Of the compounds represented by the formula (II), those represented by the formula (II-1) are especially preferred in the present invention.

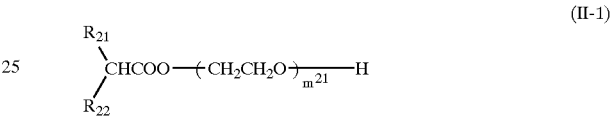

wherein, $R_{21}$ and $R_{22}$ each independently represents a $C_{2-20}$ saturated hydrocarbon group. The number of carbon atoms is preferably 4 to 13. Examples of the $C_{2-20}$ saturated hydrocarbon group represented by $R_{21}$ or $R_{22}$ include ethyl, n-butyl, i-butyl, n-pentyl, n-hexyl, n-heptyl, n-octyl, 2-ethylhexyl, n-nonyl, n-decyl, n-dodecyl, n-hexadecyl and n-octadecyl. $m^{21}$ represents an average moles of ethylene oxide added and more specifically 2 to 40, more preferably 3 to 30.

Specific examples of the compound represented by the formula (II) will next be described, but the present invention is not limited thereto.

W2-1,2

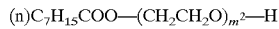

W2-1: $m^2=10$
W2-2: $m^2=15$
W2-3~5

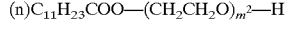

W2-3: $m^2=10$
W2-4: $m^2=15$
W2-5: $m^2=20$
W2-6~7

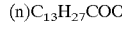

W2-6: $m^2=10$
W2-7: $m^2=15$
W2-8,9

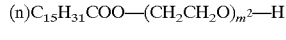

W2-8: $m^2=10$
W2-9: $m^2=15$
W2-10,

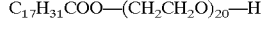

W2-11

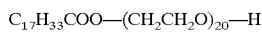

W2-12

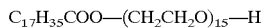

Specific examples of the compound represented by the formula (II-1) will next be described, but the present invention is not limited thereto.

TABLE 15

Specific examples of the compound of the formula (11-1)

| No. | $R^{21}$ | $R^{22}$ | $m^{21}$ |
|---|---|---|---|
| W2-13 | $C_2H_5$ | $C_4H_9$ | 3 |
| W2-14 | $C_2H_5$ | $C_4H_9$ | 5 |
| W2-15 | $C_4H_9$ | $C_6H_{13}$ | 9.5 |
| W2-16 | $C_6H_{13}$ | $C_8H_{17}$ | 5 |
| W2-17 | $C_6H_{13}$ | $C_8H_{17}$ | 8 |
| W2-18 | $C_6H_{13}$ | $C_8H_{17}$ | 10 |
| W2-19 | $C_6H_{13}$ | $C_8H_{17}$ | 11.4 |
| W2-20 | $C_6H_{13}$ | $C_8H_{17}$ | 12.5 |
| W2-21 | $C_6H_{13}$ | $C_8H_{17}$ | 15 |
| W2-22 | $C_6H_{13}$ | $C_8H_{17}$ | 25 |
| W2-23 | $C_7H_{15}$ | $C_9H_{19}$ | 14 |
| W2-24 | $C_7H_{15}$ | $C_9H_{19}$ | 15 |
| W2-25 | $C_7H_{15}$ | $C_9H_{19}$ | 20 |
| W2-26 | $C_7H_{15}$ | $C_9H_{19}$ | 25 |
| W2-27 | $C_8H_{17}$ | $C_{10}H_{21}$ | 30 |
| W2-28 | $C_{10}H_{21}$ | $C_{12}H_{25}$ | 20 |
| W2-29 | $C_{10}H_{21}$ | $C_{12}H_{25}$ | 25 |
| W2-30 | $C_{10}H_{21}$ | $C_{13}H_{27}$ | 20 |
| W2-31 | $C_{10}H_{21}$ | $C_{13}H_{27}$ | 25 |
| W2-32 | $C_{10}H_{21}$ | $C_{13}H_{27}$ | 40 |

The compounds represented by the formulas (I) and (II) in the present invention can be synthesized in a known manner. They are available, for example, by the process as described in, for example, "Shin Kaimenkasseizai Nyumon (Introduction to Surfactants)" (1992), p94 to p107, ed. by Takehiko Fujimoto. In the present invention, compounds of the formulas (I) and (II) may be used either singly or in combination.

The surfactant is incorporated in an amount of 0.001 to 15% by mass, preferably 0.005 to 10% by mass, more preferably 0.01 to 5% by mass based on the ink including the compound of the present invention represented by the formula (I) or (II).

The inkjet recording ink of the invention can be prepared by dissolving and/or dispersing, in an aqueous medium, the azo dye and the surfactant. The term "aqueous medium" as used herein means an aqueous medium obtained by adding an additive such as humectant, stabilizer and/or antiseptic as needed to water or a mixture of water and a small amount of a water miscible organic solvent.

Examples of the water miscible organic solvent usable in the invention include alcohols (such as methanol, ethanol, propanol, isopropanol, butanol, isobutanol, sec-butanol, t-butanol, pentanol, hexanol, cyclohexanol and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexane triol and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethylether acetate, triethylene glycol monomethyl ether, triethylene glycol monoethyl ether and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine) and other polar solvents (ex. formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). At least two of these water miscible organic solvents can be used in combination.

When the azo dye is an oil soluble dye, it can be prepared by dissolving the oil soluble dye in a high-boiling-point organic solvent and then dispersing and emulsifying the resulting solution in an aqueous medium.

The high-boiling-point organic solvent to be used in the invention has a boiling point of 150° C. or greater, preferably 170° C. or greater.

Examples include phthalic acid esters (such as dibutyl phthalate, dioctyl phthalate, dicyclohexyl phthalate, di-2-ethylhexyl phthalate, decyl phthalate, bis(2,4-di-tert-amylphenyl) isophthalate, and bis(1,1-diethylpropyl) phthalate), phosphoric acid or phosphonic acid esters (such as diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, and di-2-ethylhexylphenyl phosphate), benzoic acid esters (such as 2-ethylhexyl benzoate, 2,4-dichlorobenzoate, dodecyl benzoate, and 2-ethylhexyl-p-hydroxy benzoate), amides (such as N,N-diethyldodecanamide and N,N-diethyllaurylamide), alcohols or phenols (such as isostearyl alcohol and 2,4-di-tert-amylphenol), aliphatic esters (such as dibutoxyethyl succinate, di-2-ethylhexyl succinate, 2-hexyldecyl tetradecanoate, tributyl citrate, diethyl azelate, isostearyl lactate and trioctyl citrate), aniline derivatives (such as N,N-dibutyl-2-butoxy-5-tert-octylaniline), chlorinated paraffins (such as paraffins having a chlorine content of 10 to 80%), trimesic acid esters (such as tributyl trimesate), dodecyl benzene, diisopropyl naphthalene, phenols (such as 2,4-di-tert-amylphenol, 4-dodecyloxyphenol, 4-dodecyloxycarbonylphenol and 4-(4-dodecyloxyphenylsulfonyl)phenol), carboxylic acids (such as 2-(2,4-di-tert-amylphenoxybutyric acid and 2-ethoxyoctanedacanoic acid), and alkylphosphoric acids (such as di-2(ethylhexyl)phosphoric acid and diphenylphosphoric acid). These high-boiling-point organic solvents may be used in an amount of 0.01 to 3 times the mass, preferably 0.01 to 1 time the mass of the oil soluble dye.

These high-boiling-point organic solvents may be used either singly or in combination of two or more [for example, tricresyl phosphate and dibutyl phthalate, trioctyl phosphate and di(2-ethylhexyl)sebacate, or dibutyl phthalate and poly (N-t-butyl acrylamide)].

Compounds other than the above-described high-boiling-point organic solvents but usable in the present invention and/or synthesizing processes thereof are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, or 5,013,639; European Patent No. 2,76,319A, 286,253A, 289,820A, 309, 158A, 309,159A, 309,160A, 509,311A, or 510,576A; East German Patent No. 147,009, 157,147, 159,573, or 225, 240A; British Patent No. 2,091,124A; Japanese Patent Laid-Open No. 47335/1973, 26530/1975, 25133/1976, 26036/1976, 27921/1976, 27922/1976, 149028/1976, 46816/1977, 1520/1978, 1521/1978, 15127/1978, 146622/1978, 91325/1979, 106228/1979, 118246/1979, 59464/1980, 64333/1981, 81836/1981, 204041/1984, 84641/1986, 118345/1987, 247364/1987, 167357/1988, 214744/1988, 301941/1988, 9452/1989, 9454/1989, 68745/1989, 101543/1989, 102454/1989, 792/1990, 4239/1990, 43541/1990, 29237/1992, 30165/1992, 232946/1992 or 346338/1992.

The above-described high-boiling-point organic solvents may be used in an amount of 0.01 to 3.0 times the mass, preferably 0.01 to 1.0 time the mass of the oil soluble dye.

In the invention, the oil soluble dye or high-boiling-point organic solvent is dispersed and emulsified in an aqueous medium. Upon emulsification and dispersion, a low-boiling-point organic solvent can be sometimes used from the viewpoint of emulsifying properties. The low-boiling-point organic solvent is an organic solvent having a boiling point of 30° C. or greater but not greater than 150° C. under normal pressure. Preferred examples include, but not limited to, esters (ethyl acetate, butyl acetate, ethyl propionate, β-ethoxyethyl acetate and methyl cellosolve acetate), alcohols (such as isopropyl alcohol, n-butyl alcohol and secondary butyl alcohol), ketones (such as methyl isobutyl ketone, methyl ethyl ketone and cyclohexanone), amides (such as dimethylformamide and N-methylpyrrolidone) and ethers (such as tetrahydrofuran and dioxane).

Emulsification and dispersion are conducted for the purpose of forming fine oil droplets of an oil phase by dispersing, in an aqueous phase composed mainly of water, an oil phase having a dye dissolved in a high-boiling-point organic solvent or, in some cases, in a mixed solvent thereof with a low-boiling-point organic solvent. At this time, to either one of the aqueous phase or oil phase or both of them, an additive such as surfactant, humectant, dye stabilizer, emulsion stabilizer, antiseptic and/or antifungal agent, which will be described later, may be added as needed.

Emulsification is usually conducted by adding an oil phase to an aqueous phase. Alternatively, so-called phase inversion emulsification wherein an aqueous phase is added dropwise to an oil phase can be preferably employed.

Various surfactants can be employed upon dispersion and emulsification in the invention. Preferred examples include anionic surfactants such as fatty acid salts, alkyl sulfates, alkylbenzene sulfonates, alkylnaphthalene sulfonates, dialkyl sulfosuccinates, alkyl phosphates, naphthalenesulfonic acid-formalin condensate, and polyoxyethylene alkyl sulfates; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene oxypropylene block copolymers. As well as these surfactants, SURFYNOLS (trade name; product of Air Products & Chemicals) which are acetylene series polyoxyethylene oxide surfactants are preferred. Amine oxide type amphoteric surfactants such as N,N-dimethyl-N-alkylamine oxides are also preferred. Moreover, surfactants as described in Japanese Patent Laid-Open No. 157,636/1984, pp. (37)–(38), and Research Disclosure No. 308119 (1989) are also usable.

In order to stabilize the emulsion rightly after emulsification, a water soluble polymer can be added in combination with the surfactant. As the water soluble polymer, polyvinyl alcohol, polyvinyl pyrrolidone, polyethylene oxide, polyacrylic acid and polyacrylamide, and copolymers thereof are preferred. Natural water-soluble polymers such as polysaccharides, casein and gelatin are also preferred. In order to stabilize the dispersion of a dye, it is possible to use, in combination, polyvinyl, polyurethane, polyamide, polyurea or polycarbonate available by the polymerization of an acrylate ester, methacrylate ester, vinyl ester, acrylamide, methacrylamide, olefin, styrene, vinyl ether, or acrylonitrile, which polymer is substantially insoluble in an aqueous medium. These polymers preferably contain $-SO^{2-}$ or $-COO^-$. When such a polymer substantially insoluble in an aqueous medium is used in combination, it is used preferably in an amount not greater than 20% by mass, more preferably not greater than 10% by mass, based on the high-boiling-point organic solvent.

Upon preparation of an aqueous ink by dispersing and emulsifying an oil soluble dye or high-boiling-point organic solvent, control of its particle size is of particular importance. It is essential to minimize the average particle size in order to heighten color purity or density upon formation of an image by inkjet. The volume-average particle size is preferably 1 μm or less, more preferably 5 to 100 nm.

The volume average particle size and particle distribution of the dispersed particles can be measured readily in a known manner, for example, the static light scattering method, dynamic light scattering method, centrifugal precipitation method or the method described on pages 417 to 418 of Jikken Kagaku Koza, 4th Edition. For example, a particle size can be measured easily by diluting an ink with distilled water to give the particle concentration in the ink of 0.1 to 1% by mass and measuring the resulting diluted ink by a commercially available volume-average particle size measuring instrument (for example, Microtrac UPA (trade name; product of Nikkiso Co., Ltd.). The dynamic light scattering method using Laser Doppler effect permits measurement of small particle size so that it is especially preferred.

The volume-average particle size is an average particle size based on the volume of the particles and it is found by multiplying the diameter of each particle by its volume and then dividing the sum of the products by the total volume of the particles. There is a description on page 119 of "Kobunshi Latex no Kagaku (Chemistry of High Molecular Latex)" (written by Soichi Muroi, published by Kobunshi Kankokai).

It has been revealed that the existence of coarse particles plays an important role in printing performance. Described specifically, coarse particles cause clogging of a head nozzle or, if not so, form a stain and prevent discharge or cause irregular discharge of the ink, thereby having a serious influence on the printing performance. To prevent such phenomena, it is important to control the number of the particles having a particle size of 5 μm or greater to 10 or less and the number of the particles having a particle size of 1 μm or greater to 1000 or less, in 1 μl of the resulting ink.

Such coarse particles can be removed by known centrifugal separation or precise filtration. Such separation may be conducted rightly after dispersion and emulsification, or after addition of various additives such as humectant and surfactant to the emulsified dispersion but rightly before filling a cartridge with the mixture.

A mechanical emulsifier can be employed as an effective means for decreasing the average particle size and removing coarse particles.

As the emulsifier, usable are known ones such as simple stirring system using a stirrer or impeller, inline stirring system, mill system using a colloid mill or ultrasonic wave system. A high pressure homogenizer is however especially preferred.

Mechanism of a high pressure homogenizer is described specifically in U.S. Pat. No. 4,522,354 or Japanese Patent Laid-Open No. 47264/1994. Examples of the commercially available one include Gaulin homogenizer (product of A.P.V GAULIN INC), microfluidizer (product of MICROFLUI-DEX INC.) and Ultimaizer (product of Sugino Machine).

A recently developed high pressure homogenizer as described in U.S Pat. No. 5,720,551 having a mechanism for forming fine droplets in a ultrahigh pressure jet stream is particularly effective for emulsification and dispersion of the invention. "DeBEE 2000" (product of BEE INTERNATIONAL LTD.) is one of the emulsifiers adopting this ultrahigh pressure jet stream.

The pressure upon emulsification by a high pressure emulsifier is at least 50 MPa, preferably at least 60 MPa, still more preferably at least 180 MPa.

Use of at least two emulsifiers, for example, emulsification by a stirring emulsifier, followed by the use of a high pressure homogenizer is particularly preferred. It is also preferred to disperse and emulsify by such emulsifiers, add to the resulting emulsion an additive such as humectant and surfactant and subject the resulting mixture to high pressure homogenizer again while filling a cartridge with the resulting ink.

When both of a high boiling point organic solvent and a low boiling point organic solvent are incorporated, removal of the low boiling point solvent is preferred for stability, safety and sanitation of the emulsion. The low boiling point solvent can be removed in a known manner, for example, evaporation, vacuum evaporation or ultrafiltration, depending on the kind of the solvent. This removal of the low boiling point organic solvent is preferably conducted as soon as possible rightly after emulsification.

To the inkjet recording ink composition obtained by the invention, additives selected as needed from antidrying agent for preventing clogging at a jet orifice due to drying of an ink, penetration promoter to promote penetration of an ink into paper, ultraviolet absorber, antioxidant, viscosity regulator, surface tension regulator, dispersant, dispersion stabilizer, antifungal agent, rust preventive, pH regulator, antifoaming agent and chelating agent can be added.

As the antidrying agent to be used in the invention, water soluble organic solvents having a vapor pressure lower than that of water are preferred. Specific examples include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of a polyvalent alcohol such as ethylene glycol monomethyl (or ethyl) ether, diethylene glycol monomethyl (or ethyl) ether and triethylene glycol monoethyl (or butyl) ether; heterocyclics such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Of these, polyhydric alcohols such as glycerin and diethylene glycol are more preferred. The above-exemplified antidrying agents may be used either singly or in combination. The antidrying agent is preferably added in an amount of 10 to 50% by mass of the ink.

Examples of the penetration promoter usable in the invention include alcohols such as ethanol, isopropanol, butanol, di(tri)-ethylene glycol monobutyl ether, and 1,2-hexanediol and nonionic surfactants such as sodium lauryl sulfate and sodium oleate. Incorporation of it in an amount of 10 to 30% by mass in an ink brings about sufficient effects. It is preferably added in an amount within a range causing neither bleeding of print nor print-through.

Examples of the ultraviolet absorber to be used in the invention for improving the shelf life of images include benzotriazole compounds as described in Japanese Patent Laid-Open Nos. 185677/1983, 190537/1986, 782/1990, 197075/1993 and 34057/1997, benzophenone compounds as described in Japanese Patent Laid-Open Nos. 2784/1971 and 194483/1993 and U.S. Pat. No. 3,214,463, cinnamic acid compounds as described in Japanese Patent Publication No. 30492/1973 and 21141/1981 and Japanese Patent Laid-Open No. 88106/1998, triazine compounds as described in Japanese Patent Laid-Open No. 298503/1992, 53427/1996, 239368/1996 and 182621/1998 and International Patent Publication No. 501291/1996, and so-called fluorescent brighteners—compounds which emit fluorescence, absorbing ultraviolet rays—typified by the compounds as described in Research Disclosure No. 24239, and stilbene and benzoxazole compounds.

As the antioxidant for improving shelf life of a recorded image, various organic and metal complex type fading preventives can be used in the invention. Organic fading preventives include hydroquinones, alkoxyphenols, dialkoxyphenols, phenols, anilines, amines, indanes, coumarones, alkoxyanilines and heterocycles, while metal complexes include nickel complexes and zinc complexes. More specifically, compounds as described in "Research Disclosure, No. 17643, VII, Section I or J, No. 15162, No. 18716, left column on page 650, No. 36544, page 527, No. 307105, page 872, and the patent cited in No. 15162, and compounds embraced in the formula of the typical compounds and compound examples described on pages 127 to 137 of Japanese Patent Laid-Open No. 215272/1987.

Examples of the antifungal agent usable in the invention include sodium dehydroacetate, sodium benzoate, sodium pyridinethion-1-oxide, ethyl p-hydroxybenzoate and 1,2-benzisothiazolin-3-one and salts thereof. It is preferably added in an amount of 0.02 to 5.00% by mass of the ink.

Details of the antifungal agent are described in "Dictionary of Antibacterial and Antifungal Agents" (ed. by The Society for Antibacterial and Antifungal Agents, Japan).

Examples of the rust inhibitor include acidic sulfites, sodium thiosulfate, ammonium thioglycolate, diisopropylammonium nitrite, pentaerythritol tetranitrate, dicyclohexylammonium nitrite and benzotriazole. It is preferably added in an amount of 0.02 to 5.00% by mass in the ink.

The pH regulator to be used in the invention functions well for regulating pH of the ink, thereby imparting it with dispersion stability. The pH regulator is preferably added to adjust the pH of the ink to 4.5 to 10.0, more preferably to 6 to 10.0.

As basic pH regulators, organic bases and inorganic alkalis are usable while as acidic ones, organic acids and inorganic acids are usable The organic bases include triethanolamine, diethanolamine, N-methyldiethanolamine and dimethylethanolamine. The inorganic alkalis include hydroxides of an alkali metal (ex. sodium hydroxide, lithium hydroxide and potassium hydroxide), carbonates (ex. sodium carbonate and sodium bicarbonate) and ammonia.

The organic acids include acetic acid, propionic acid, trifluoroacetic acid and alkylsulfonic acid. The inorganic acids include hydrochloric acid, sulfuric acid and phosphoric acid.

As the surface tension regulator, noionic, cationic and anionic surfactants other than those described above are usable in the invention. Examples of the anionic surfactants include fatty acid salts, alkyl sulfates, alkyl benzenesulfonates, alkyl naphthalene sulfonates, dialkyl sulfosuccinates, alkyl phosphates, naphthalenesulfonic acid formalin condensate, and polyoxyethylene alkyl sulfate esters; those of the nonionic surfactants include polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymers. SURFYNOLS (trade name; product of Air Products & Chemicals Inc.) which are acetylene type polyoxyethylene oxide surfactants are also preferably employed. Amine oxide type amphoteric surfactants such as N,N-dimethyl-N-alkylamine oxide are also preferred. Surfactants as described in Japanese Patent Laid-Open No. 157,636/1984, p(37) to p(38) and Research Disclosure No. 308119 (1989) are also usable.

The ink of the invention containing or not containing such a regulator is preferred to have a surface tension of 20 to 60 mN/m, more preferably 25 to 45 mN/m.

The ink usable in the invention has preferably a viscosity of 30 mPa·s or less. Since it has a viscosity of 20 mPa·s or less, a viscosity regulator is sometimes added to adjust its viscosity. Examples of the viscosity regulators include celluloses, water soluble polymers such as polyvinyl alcohol, and nonionic surfactants. More specific description about viscosity regulators can be found in Chapter 9 of "Viscosity Regulating Technique" (Information Technology Association, 1999) and pages 162 to 174 of "Chemicals for Inkjet Printers (Supplement, 98)—Researches on Development Trend and Prospect of Materials—" (CMC, 1997)).

In the invention, it is also possible to add, as needed, the above-described cationic, anionic or nonionic surfactant as a dispersant or dispersion stabilizer, and a fluorine or silicon compound, or a chelating agent typified by EDTA as an antifoaming agent.

Recording paper and recording film to be used in the image recording method of the invention will next be described. As recording paper and recording film, usable are those having, as a support, chemical pulp such as LBKP or NBKP, mechanical pulp such as GP, PGW, RMP, TMP, CTMP, CMP or CGP, or recycled pulp such as DIP, to which conventionally known additives such as pigment, binder, sizing agent, fixer, cationic agent and paper strength agent have been added as needed, and made using paper machine such as wire paper machine or cylinder paper machine. Alternatively, the support may be synthetic paper or plastic film sheet and it preferably has a thickness of 10 to 250 μm and a basis weight of 10 to 250 g/m².

The support may be used as a receiving material after disposing thereon an image receiving layer and back coat layer, or after disposing a size press or anchor coat layer by using starch or polyvinyl alcohol and then disposing thereon an image receiving layer and a back coat layer. The support may further be subjected to flattening treatment by a calendering machine such as machine calender, TG calender or soft calender.

In the invention, paper or a plastic film having both sides thereof laminated with polyolefin (ex. polyethylene, polystyrene, polyethylene terephthalate or polybutene, or copolymer thereof) is preferably employed as the support. Addition of a white pigment (ex. titanium oxide or zinc oxide) or a tinting dye (ex. cobalt blue, ultramarine or neodium oxide) to polyolefin is preferred.

In the image receiving layer disposed on the support, a porous material and an aqueous binder are incorporated. The image receiving layer preferably contains a pigment, preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate and organic pigments such as styrene pigments, acrylic pigments, urea resins and melamine resins. As the white pigment, porous white inorganic pigment, particularly, synthetic amorphous silica having a large pore area is preferred. As the synthetic amorphous silica, silicic anhydride available by dry process and hydrated silicic acid available by wet process are usable, of which hydrated silicic acid is desired. These pigments may be used in combination.

Examples of the aqueous binder contained in the image receiving layer include water-soluble polymers such as polyvinyl alcohol, silanol-modified polyvinyl alcohol, starch, cationated starch, casein, gelatin, carboxymethyl cellulose, hydroxyethyl cellulose, polyvinylpyrrolidone, polyalkylene oxide and polyalkylene oxide derivatives and water-dispersible polymers such as styrene butadiene latex and acrylic emulsion. These aqueous binders may be used either singly or in combination. Of them, polyvinyl alcohol and silanol-modified polyvinyl alcohol are particularly preferred from the viewpoints of adhesion to the pigment and peel resistance of the ink receptive layer.

The image receiving layer may contain, in addition to, the pigment and aqueous binder, a mordant, a water proofing agent, light resistance improver, surfactant, hardener and the like additives.

The mordant to be added to the image receiving layer is preferably immobilized. A polymeric mordant is preferably employed for this purpose.

Polymeric mordants are described in Japanese Patent Laid-Open Nos. 28325/1973, 74430/1979, 124726/1979, 22766/1980, 142339/1980, 23850/1985, 23851/1985, 23852/1985, 23853/1985, 57836/1985, 60643/1985, 118834/1985, 122940/1985, 122941/1985, 122942/1985, 235134/1985 and 161236/1989, and U.S. Pat. Nos. 2,484,430, 2,548,564, 3,148,061, 3,309,690, 4,115,124, 4,124,386, 4,193,800, 4,273,853, 4,282,305 and 4,450,224. Image receiving materials containing the polymer mordant as described on pages 212 to 215 of Japanese Patent Laid-Open 161236/1989 are particularly preferred. Use of these polymer mordants makes it possible to form an image having excellent image quality and improved light resistance.

A water proofing agent is effective for improving water resistance of a recorded image and as this agent, cationic resins are particularly desired. These cationic resins include polyamide polyamine epichlorohydrin, polyethyleneimine, polyaminesulfone, dimethyldiallyl ammonium chloride polymer, cation polyacrylamide and colloidal silica. Of these cationic resins, polyamide polyamine epichlorohydrin is particularly preferred. The cationic resin is preferably added in an amount of 1 to 15% by mass, particularly 3 to 10% by mass based on the whole solid content of the ink receiving layer.

Examples of the light resistance improver include zinc sulfate, zinc oxide, hindered amine antioxidants and benzophenone or benzotriazole ultraviolet absorbers, of which zinc sulfate is particularly preferred.

The surfactant functions as a coating aid, peeling improver, slip improver or antistatic agent. Description on the surfactant can be found in Japanese Patent Laid-Open Nos. 173463/1987 and 183457/1987.

Instead of the surfactant, organofluoro compounds may be employed. They are preferably hydrophobic. Examples include fluorine surfactants, oily fluorine compounds (ex. fluorine oil) and solid fluorine compound resins (ex. ethylene tetrafluoride resins). Organofluoro compounds are described in Japanese Patent Publication No. 9053/1982 (8th to 17th columns), and Japanese Patent Laid-Open Nos. 20994/1986 and 135826/1987.

As the hardener, materials as described on page 222 of Japanese Patent Laid-Open No. 161236/1989 are usable.

As other additives to the image receiving layer, pigment dispersants, thickeners, antifoaming agents, dyes, fluorescent brighteners, antiseptics, pH regulators, matting agents and hardeners can be used. The ink receiving layer may be a single layer or a double layer.

The recording paper or recording film may have a back coat layer disposed thereon. To this layer, white pigments, aqueous binders and the other components can be added.

Examples of the white pigment to be incorporated in the back coat layer include white inorganic pigments such as light calcium carbonate, heavy calcium carbonate, kaolin, talc, calcium sulfate, barium sulfate, titanium dioxide, zinc oxide, zinc sulfide, zinc carbonate, titan white, aluminum silicate, diatomaceous earth, calcium silicate, magnesium silicate, synthetic amorphous silica, colloidal silica, colloidal alumina, pseudo boehmite, aluminum hydroxide, alumina, litopone, zeolite, hydrated halloysite, magnesium carbonate and magnesium hydroxide, and organic pigments such as styrene plastic pigment, acrylic plastic pigment, polyethylene, microcapsules, urea resins and melamine resins.

As the aqueous binder to be incorporated in the back coat layer, usable are water soluble polymers such as styrene/maleate salt copolymers, styrene/acrylate salt copolymers, polyvinyl alcohol, silanol-modified polyvinyl alcohol, starch, cationated starch, casein, gelatin, carboxymethyl cellulose, hydroxyethyl cellulose and polyvinylpyrrolidone, and water dispersible polymers such as styrene butadiene latex and acrylic emulsion. Examples of the other component to be incorporated in the back coat layer include antifoaming agent, foaming inhibitor, dye, fluorescent brightener, antiseptic and water proofing agent.

To layers (including back layer) constituting the ink-jet recording paper or recording film, a fine particle dispersion of a polymer may be added. It is used in order to improve the physical properties of a film, for example, stabilizing size and preventing curling, adhesion and cracks. A description on the fine particle dispersion of a polymer can be found in Japanese Patent Laid-Open Nos. 245258/1987, 1316648/1987 and 110066/1987. Addition of a fine particle dispersion of a polymer having a low glass transition point (40° C. or lower) to a mordant-containing layer enables to prevent occurrence of cracks or curing of the layer. Addition of a fine particle dispersion of a polymer having a high glass transition point also prevents occurrence of curling even when added to the back layer.

The ink composition of the invention can be used for any known inkjet recording method, for example, a charge control method of ejecting ink by making use of electrostatic induction power, drop-on-demand method (pressure pulse method) making use of oscillation pressure of a piezoelectric element, acoustic ink-jet method of exposing ink to acoustic beams converted from electric signals and utilizing a radiation pressure for discharging ink, and thermal ink-jet (bubble jet) method of heating ink to form bubbles and making use of the pressure thus generated.

Ink-jet recording methods include a method of jetting a number of photoinks, that is, small-volume inks having a low concentration, a method of improving image quality by using a plurality of inks having substantially the same hue but different concentrations and a method of using a colorless transparent ink.

EXAMPLES

The present invention will hereinafter be described in detail by Examples. It should however be borne in mind that the present invention is not limited to or by them.

Example 1

To the below-described components, deionized water was added to give the whole amount of 1 liter. While heating at 30 to 40° C., the mixture was stirred for one hour. The reaction mixture was then adjusted to pH 9 with 10 mol/l of KOH, followed by filtration, under reduced pressure, through a microfilter having a average pore size of 0.25 $\mu$m, whereby a light magenta ink solution was prepared.

| | |
|---|---|
| Magenta dye of the invention (a-27) | 7.5 g/l |
| Diethylene glycol | 150 g/l |
| Urea | 37 g/l |
| Glycerin | 130 g/l |
| Triethylene glycol monobutyl ether | 130 g/l |
| Triethanolamine | 6.9 g/l |
| Benzotriazole | 0.08 g/l |
| PROXEL XL2 | 3.5 g/l |
| Surfactant (W1-18) | 10 g/l |

In a similar manner to the above-described method except that the kind of a dye or additive was changed, magenta ink, light cyan ink, cyan ink, yellow ink and black ink were prepared to form Ink Set 101 as shown in Table 16.

TABLE 16

| | Light magenta | Magenta | Light cyan | Cyan | Yellow | Black |
|---|---|---|---|---|---|---|
| Dye (g/l) | (a-27) | (a-27) | A-2 | A-2 | A-3 | A-5 |
| | 7.5 | 30.0 | 8.75 | 35.0 | 14.7 | 20.0 |
| | | | | | A-4 | A-6 |
| | | | | | 14.0 | 20.0 |
| | | | | | | A-7 |
| | | | | | | 20.0 |
| | | | | | | A-3 |
| | | | | | | 21.0 |

TABLE 16-continued
| | | | | | | |
|---|---|---|---|---|---|---|
| Diethylene glycol (g/l) | 150 | 112 | 130 | 200 | 160 | 20 |
| Urea (g/l) | 37 | 46 | — | — | — | — |
| Glycerin (g/l) | 130 | 130 | 150 | 180 | 150 | 120 |
| Triethylene glycol monobutyl ether (g/l) | 130 | 140 | 130 | 140 | 130 | — |
| Diethylene glycol monobutyl ether (g/l) | — | — | — | — | — | 230 |
| 2-Pyrrolidone (g/l) | — | — | — | — | — | 81 |
| Surfactant (g/l) | (W1-18) 10 | (W1-18) 10 | — | — | — | — |
| Surfynol 465 (g/l) | — | — | 11.1 | 9.8 | — | — |
| Surfynol STG (g/l) | — | — | — | — | 9.0 | 8.5 |
| Triethanolamine (g/l) | 6.9 | 7.0 | 6.0 | 6.7 | 0.8 | 18.9 |
| Benzotriazole (g/l) | 0.08 | 0.07 | 0.08 | 0.08 | 0.06 | 0.06 |
| Proxel XL2 (g/l) | 3.5 | 2.5 | 1.8 | 2.0 | 2.5 | 1.8 |
Deionized water is added to give the total amount of 1 liter.
A-1
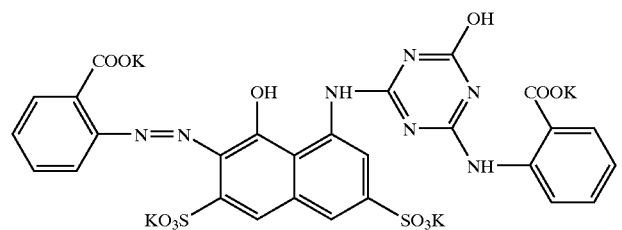
A-2
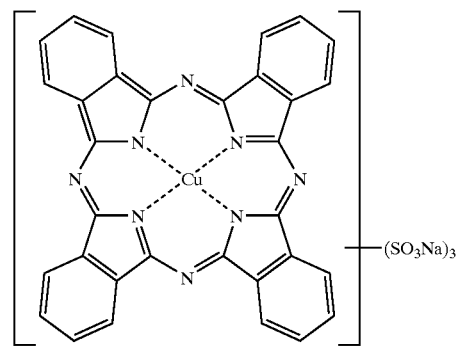
A-3
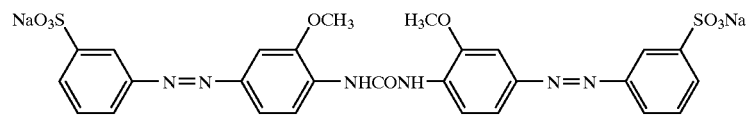
A-4

TABLE 16-continued

A-5

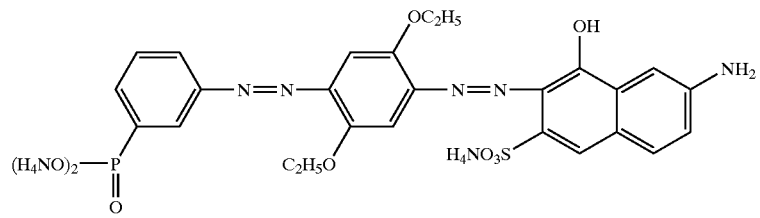

A-6

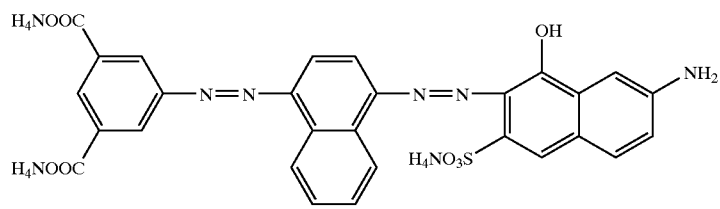

A-7

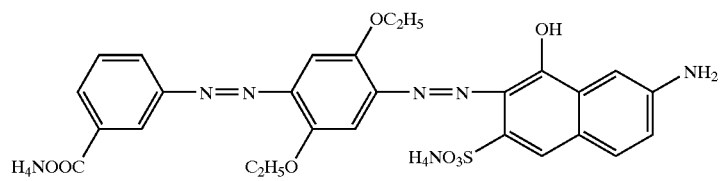

Ink sets 102 to 108 were then prepared in accordance with Table 17. The amount of the surfactant was adjusted to 1.0% by mass in any ink set.

In a similar manner to that employed for Ink set 101 except that the dye was changed to A-1, Ink set 109 of Comparative Example was prepared, while in a similar manner to that employed for Ink set 101 except for exclusion of a surfactant, Ink set 110 of Comparative Example was prepared.

These Ink sets 101 to 110 were each filled in the cartridge of "Ink Jet Printer PM670C" (trade name; product of EPSON) and by this printer, images were printed on photo-quality inkjet glossy paper EX manufactured by Fuji Photo Film. Following evaluation was conducted.

1) Discharge stability was evaluated in accordance with the below-described criteria after setting the cartridge in the printer and printing images onto 20 sheets of A4-size paper after confirmation of ink ejection from all the nozzles.
   A: Disturbance of printing did not occur at all during printing.
   B: Disturbance of printing occurred.
   C: Disturbance of printing continued from the start to the end of printing.
2) Bleeding of thin lines was evaluated as follows:
(i) thin-line patterns of yellow, magenta, cyan and black were printed and they were visually evaluated.
(ii) thin-line patterns of black were printed on the printed solid color of magenta ink and bleeding caused by contact of two colors was evaluated. In Tables 17 and 19, "○", "Δ" and "x" mean "good", "not so good" and "bad", respectively.
3) Water resistance was evaluated by the bleeding of images after immersed in deionized water for 10 seconds.
4) The printed solid image sample of magenta was prepared and the shelf life of the image was evaluated.
   (1) After measurement of the image density $C_i$ rightly after printing, the image was exposed to xenon light (85000 1x) for 10 days by using a weatherometer (product of ATLAS). The image density $C_f$ was measured again. From a dye remaining ratio $C_f/C_i*100$, light fastness was evaluated. A dye remaining ratio was evaluated at three reflection concentrations of 1, 1.5 and 2. When the dye remaining ratio was 70% or greater in all three cases, it was ranked A. When it was less than 70% in two cases, it was ranked B. When it was less than 70% in all three cases, it was ranked C.
   (2) The densities before and after the storage of the sample for 10 days under the conditions of 80° C. at 15% RH were measured using X-rite 310 and a dye remaining ratio was calculated. Heat fastness was evaluated based on this ratio. The dye remaining ratio on the image was evaluated at three reflection concentrations of 1, 1.5 and 2. When the dye remaining ratio was 90% or greater in all three cases, it was ranked A. When it was less than 90% in two cases, it was ranked B. When it was less than 90% in all three cases, it was ranked C.

The results are shown in Table 17.

TABLE 17

| Ink set | Dye | Sur-factant | Discharge stability | Light fastness | Heat fastness | Water resistance | Bleeding of thin line (1) | Bleeding of thin line (2) | Remarks |
|---|---|---|---|---|---|---|---|---|---|
| 101 | (a-27) | W1-18 | A | A | A | A | ○ | ○ | Invention product |
| 102 | (a-27) | W1-14 | A | A | A | A | ○ | ○ | Invention product |
| 103 | (a-26) | W1-16 | A | A | A | A | ○ | ○ | Invention product |
| 104 | (a-26) | W1-28 | A | A | A | A | ○ | ○ | Invention product |
| 105 | (b-5) | W2-19 | A | A | A | A | ○ | ○ | Inventian product |
| 106 | (b-5) | W2-15 | A | A | A | A | ○ | ○ | Invention product |
| 107 | (c-3) | W2-27 | A | A | A | A | ○ | ○ | Invention product |
| 108 | (c-3) | W2-31 | A | A | A | A | ○ | ○ | Invention product |
| 109 | (A-1) | W1-18 | A | B | C | B | Δ | Δ | Comparative Example |
| 110 | (a-27) | — | B | A | B | B | × | × | Comparative Example |

Example 2

At 70° C., 8 g of Dye (a-22) and 5 g of dioctyl sulfosuccinate were dissolved in 6 g of High boiling point organic solvent (s-1), 10 g of High boiling point organic solvent (s-2) and 50 ml of ethyl acetate. To the resulting solution was added 500 ml of deionized water while stirring by a magnetic stirrer, whereby an oil-in-water type coarse-particle dispersion was prepared.

Then, this coarse-particle dispersion was caused to pass through "Microfluidizer" (manufactured by Microfluidics Inc.) five times at 60 MPa to convert the dispersion into fine droplets. The resulting emulsion was desolvated in a rotary evaporator until an ethyl acetate odor disappeared.

After addition of 140 g of diethylene glycol, 64 g of glycerin, 12.8 g of Surfactant W 1-18 and an additive such as urea to the resulting fine emulsion of the oil soluble dye, 900 ml of deionized water was added. The mixture was adjusted to pH 9 with 10 mol/l of KOH, whereby a light magenta ink as shown in Table 18 was prepared. The volume-average particle size of the emulsified and dispersed ink was found to be 51 nm as a result of measurement using "Microtrac UPA" (manufactured by Nikkiso Co., Ltd.).

By changing the kinds of the dye and High-boiling-point organic solvent, magenta ink, light cyan ink, cyan ink, yellow ink and black ink for Ink set 201 as shown in Table 18 were prepared.

TABLE 18

| | Light magenta | Magenta | Light cyan | Cyan | Yellow | Black |
|---|---|---|---|---|---|---|
| Dye (g/l) | (a-22) | (a-22) | C-1 | C-1 | Y-1 | M-1 |
| | 5.00 | 20.0 | 9.3 | 37.2 | 27.2 | 10.0 |
| | | | | | | C-1 |
| | | | | | | 18.6 |
| | | | | | | Y-1 |
| | | | | | | 13.6 |
| High-boiling-point organic solvent (g/l) | S-1 | 14.52 | 6.75 | 27.0 | 19.74 | 30.6 |
| | 3.63 | 25.52 | 11.9 | 47.6 | 34.7 | 53.8 |
| | S-2 | | | | | |
| | 6.38 | | | | | |
| Sodium dioctyl-sulfosuccinate (g/l) | 6.25 | 25.0 | 11.6 | 46.4 | 34.0 | 52.7 |
| Diethylene glycol (g/l) | 110.0 | 110.0 | 110.0 | 110.0 | 110.0 | 110.0 |
| Urea (g/l) | 46.0 | 46.0 | 46.0 | 46.0 | 46.0 | 46.0 |
| Glycerin (g/l) | 50.0 | 50.0 | 50.0 | 50.0 | 50.0 | 50.0 |
| Surfactant (g/l) | (W1-18) | (W1-18) | — | — | — | — |
| | 10 | 10 | | | | |
| Surfynol 465 (g/l) | — | — | 5.5 | 5.5 | 5.5 | 5.5 |
| Triethanolamine (g/l) | 7.5 | 7.5 | 7.5 | 7.5 | 7.5 | 7.5 |

TABLE 18-continued
|  | Light magenta | Magenta | Light cyan | Cyan | Yellow | Black |
|---|---|---|---|---|---|---|
| Benzotriazole (g/l) | 0.075 | 0.075 | 0.075 | 0.075 | 0.075 | 0.075 |
| Proxel XL2 (g/l) | 2.5 | 2.5 | 2.5 | 2.5 | 2.5 | 2.5 |
| Deionized water is added to give the total amount of 1 liter. | | | | | | |
| Volume-average particle size | 51 nm | 53 nm | 62 nm | 65 nm | 59 nm | 70 nm |
C-1
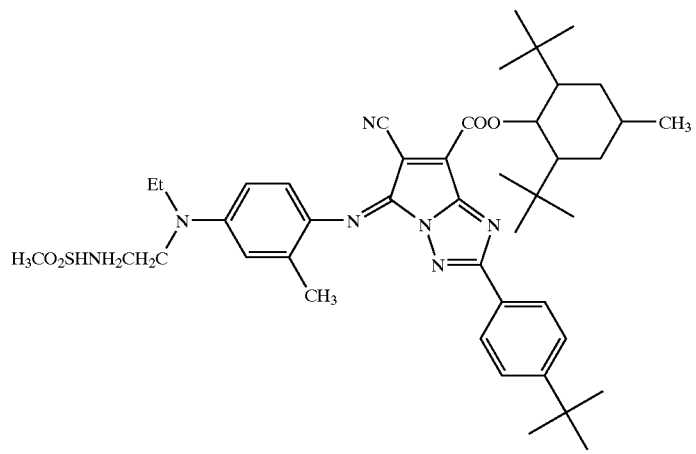
Y-1
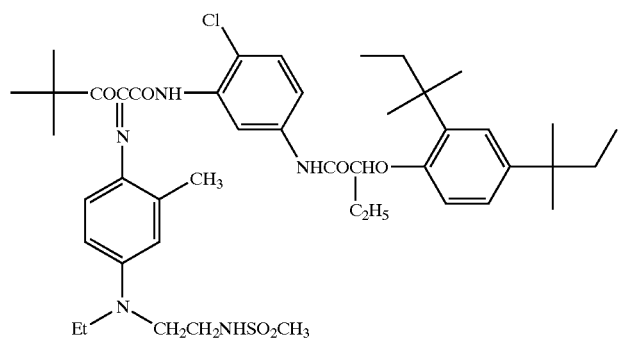
S-1
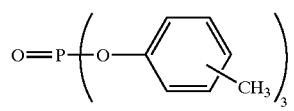
S-2
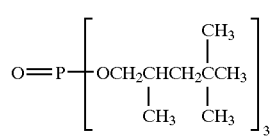

In a similar manner, Ink sets 202 to 208 were prepared in accordance with Table 19. The amount of the surfactant was adjusted to 1.0% by mass in all of them.

In a similar manner to that employed for Ink set 201 except that the dye M-1 was used instead, Ink set 209 of Comparative Example was prepared. Ink set 210 of Comparative Example was prepared in a similar manner to that employed for Ink set 201 except for the exclusion of the surfactant.

M-1

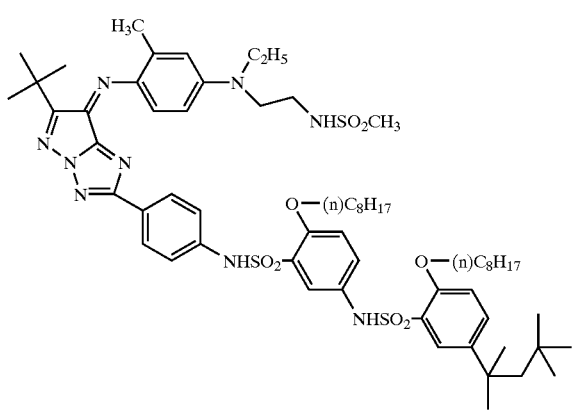

Each of these Ink sets 201 to 210 was filled in the cartridge of "Ink jet printer PM670C" (manufactured by EPSON) and by using this printer, images were printed on photo-quality inkjet glossy paper EX (product of Fuji Photo Film). They were evaluated as in Example 1.

The results thus obtained are shown in Tables 19.

The above-described results have revealed that the ink compositions of the present invention each has excellent discharge stability, weather resistance (fastness to light and heat), and water resistance and by using it, an image free of bleeding of thin lines can be obtained. An ink composition containing only the surfactant of the present invention has good discharge stability, while an ink composition containing only the azo dye of the present invention has excellent weather resistance. With regards to water resistance and bleeding, however, good results are available by the ink composition of the present invention containing both of the azo dye and the surfactant.

The present invention makes it possible to impart inkjet recording ink compositions, which are aqueous inks advantageous from the viewpoints of handling ease, odor and safety, with high discharge stability, good color hue, excellent weather resistance and water resistance and capacity of providing a recorded image free of bleeding of thin lines.

This application is based on Japanese Patent application JP 2001-203496, filed Jul. 4, 2001, the entire content of which is hereby incorporated by reference, the same as if set forth at length.

What is claimed is:

1. An ink composition for inkjet recording comprising:

an azo dye having an aromatic nitrogen-containing 6-membered heterocycle as a coupling component;

an aqueous medium; and a surfactant, wherein the azo dye is dissolved or dispersed in the aqueous medium, herein the azo dye is represented by the following formula (A-1):

TABLE 19

| Ink set | Dye | Surfactant | Discharge stability | Light fastness | Heat fastness | Water resistance | Bleeding of thin line (1) | Bleeding of thin line (2) | Remarks |
|---|---|---|---|---|---|---|---|---|---|
| 201 | (a-22) | W1-18 | A | A | A | A | ○ | ○ | Invention product |
| 202 | (a-22) | W1-14 | A | A | A | A | ○ | ○ | Invention product |
| 203 | (a-21) | W1-16 | A | A | A | A | ○ | ○ | Invention product |
| 204 | (a-21) | W1-28 | A | A | A | A | ○ | ○ | Invention product |
| 205 | (b-6) | W2-19 | A | A | A | A | ○ | ○ | Invention product |
| 206 | (b-6) | W2-15 | A | A | A | A | ○ | ○ | Invention product |
| 207 | (c-4) | W2-27 | A | A | A | A | ○ | ○ | Invention product |
| 208 | (c-4) | W2-31 | A | A | A | A | ○ | ○ | Invention product |
| 209 | (M-1) | W1-18 | A | C | C | B | Δ | Δ | Comparative Example |
| 210 | (a-22) | — | B | A | A | B | × | × | Comparative Example |

(A-1)

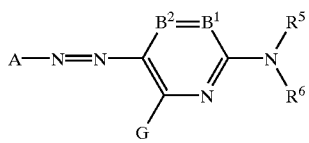

wherein

A represents a 5-membered heterocyclic group;

$B^1$ and $B^2$ represent =$CR^1$— and —$CR^2$=, respectively, or either one represents a nitrogen atom and the other one represents —$CR^1$= or —$CR^2$=;

$R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group or a sulfamoyl group, which may each have a further substituent:

G, $R^1$, and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, an alkyl- or aryl-sulfonyl group, a heterocyclic sulfonyl group, an alkyl- or aryl-sulfinyl group, a heterocyclic sulfinyl group, a sulfamoyl group, a sulfo group, or a heterocyclic thio group, which may each have a further substituent; and a pair $R^1$ and $R^5$ or a pair $R^5$ and $R^6$ may be coupled to form a 5- or 6-membered ring.

2. The ink composition according to claim 1, wherein the surfactant is a nonionic surfactant.

3. The ink composition according to claim 1, wherein the surfactant is represented by the following formula (I) or (II):

 (I)

wherein $R_1$ represents an alkyl group having 5 to 40 carbon atoms and $m^1$ is from 2 to 40,

 (II)

wherein $R_2$ represents an alkyl group having 5 to 40 carbon atoms and $m^2$ is from 2 to 40.

4. The ink composition according to claim 1, wherein A in the formula (A-1) represents one of the following formulae (a) to (f):

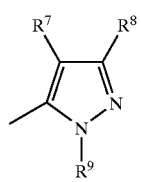 (a)

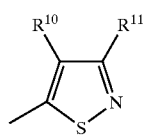 (b)

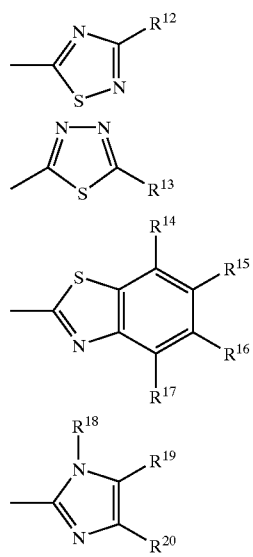

wherein each of $R^7$ to $R^{20}$ independently represents a hydrogen atom a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, an alkyl- or aryl-sulfonyl group, a heterocyclic sulfonyl group, an alkyl- or aryl-sulfinyl group, a heterocyclic sulfinyl group, a sulfamoyl group, a sulfo group, or a heterocyclic thio group, which may each have a further substituent.

5. The ink composition according to claim 1, wherein the dye represented by the formula (A-1) is a water soluble dye, and the ink composition is produced by a process comprising at least one of the steps of:

dissolving the dye and the surfactant in the aqueous medium; and dispersing the dye and the surfactant in the aqueous medium.

6. The ink composition according to claim 1, wherein the dye represented by the formula (A-1) is an oil soluble dye, and the ink composition is produced by a process comprising the steps of:

dissolving the dye in a high-boiling-point organic solvent; and dispersing the organic solvent in the aqueous medium after the dissolving.

7. An inkjet recording method, which comprises ejecting the ink composition according to claim 1.

8. An inkjet recording method comprising:

preparing an image receiving material which comprises a support and an image receiving layer comprising white inorganic pigment particles; and ejecting the ink composition according to claim 1 to the image receiving material according to a recording signal.

* * * * *